United States Patent [19]
Ando et al.

[11] Patent Number: 5,534,120
[45] Date of Patent: Jul. 9, 1996

[54] MEMBRANELESS WATER ELECTROLYZER

[75] Inventors: Shigeru Ando; Hisato Haraga; Hidetaka Miyahara; Junji Tanaka; Hiroshi Takamatsu, all of Kita-kyushi, Japan

[73] Assignee: Toto Ltd., Fukuoka, Japan

[21] Appl. No.: 497,742

[22] Filed: Jul. 3, 1995

[51] Int. Cl.[6] ............... C02F 1/46; C25B 1/26; C25B 15/08
[52] U.S. Cl. ............ 205/464; 204/269; 204/275; 205/500; 205/618
[58] Field of Search ............... 204/128, 149, 204/269, 275, 95

[56] References Cited

U.S. PATENT DOCUMENTS

| | | | |
|---|---|---|---|
| 4,761,208 | 8/1988 | Gram et al. | 204/275 X |
| 5,256,268 | 10/1993 | Goto et al. | 204/269 X |
| 5,340,458 | 8/1994 | Koizumi | 204/275 X |
| 5,395,492 | 3/1995 | Schoeberl | 204/269 X |
| 5,439,567 | 8/1995 | Cook | 204/269 X |

FOREIGN PATENT DOCUMENTS

| | | |
|---|---|---|
| 56-80292 | 6/1981 | Japan . |
| 57-8957 | 2/1982 | Japan . |
| 58-47984 | 11/1983 | Japan . |
| 58-47985 | 11/1983 | Japan . |
| 58-189090 | 11/1983 | Japan . |
| 4-110189 | 9/1992 | Japan . |
| 4-284889 | 10/1992 | Japan . |

*Primary Examiner*—Donald R. Valentine
*Attorney, Agent, or Firm*—Finnegan, Henderson, Farabow, Garrett & Dunner

[57] ABSTRACT

A water electrolyzer for electrolyzing water to produce and recover acidic and/or alkaline water. The electrolyzer is of the membraneless laminar-flow type which is designed to electrolyze water without placing a membrane between the electrodes. To this end, the anode and cathode are arranged closely with one another with a very small spacing (generally less than 1 mm) to establish a laminar flow in a narrow flow path. The anode is provided with a slit-shaped aperture for separating a thin layer of acidic water flowing along the anode surface. This aperture is situated sufficiently upstream of the downstream end of the flow path to ensure that the layer of acidic water is separated away from the remainder of the laminar flow while the laminar flow is sustained in the flow path. Accordingly, formation of turbulence at a point of acidic water separation is minimized so that highly acidic water can be recovered.

19 Claims, 15 Drawing Sheets

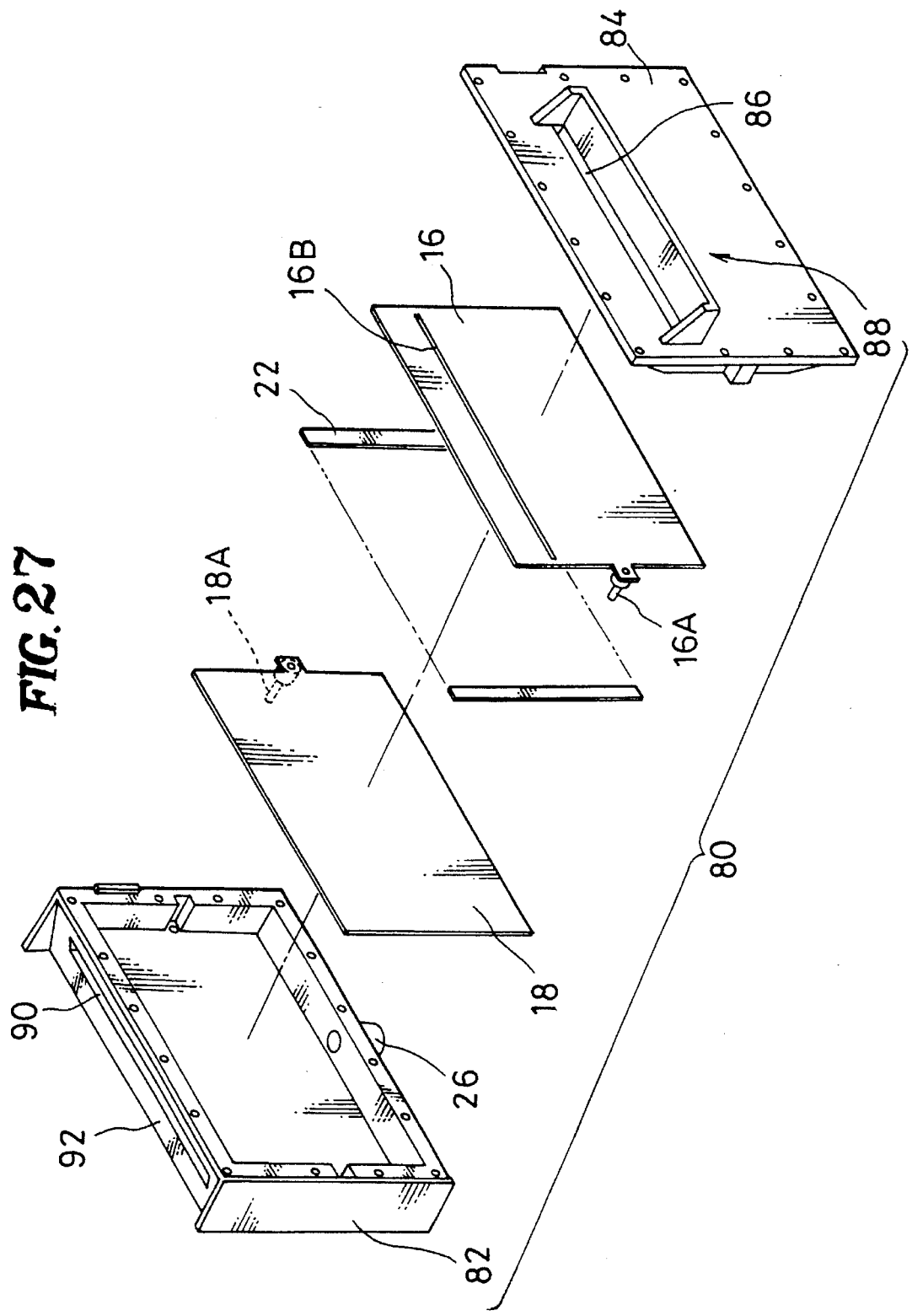

MEMBRANELESS WATER ELECTROLYZER

BACKGROUND OF THE INVENTION

1. Field of the Invention

The present invention relates broadly to an apparatus for electrochemically processing water to modify the hydrogen ion concentration (pH) thereof and, more specifically, to an apparatus for electrolyzing water to produce alkaline and/or acidic water. In particular, the present invention is directed to improvements in a water electrolyzer of the continuous-flow membraneless type wherein alkaline water and acidic water generated by the electrolysis of water are separated from each other without recourse to the use of a membrane.

2. Description of the Prior Art

It is believed that hydroxyl ion ($OH^-$) enriched alkaline water, which is often referred-to as "alkaline ion water", is useful in health maintenance when served as potable water as well as in accentuating taste when used in cooking or for the preparation of beverages such as tea and coffee. Similarly, hydrogen ion ($H^+$) enriched acidic water is known as being useful for various purposes. For example, acidic water is suitable for boiling noodles and provides an astringent effect when applied to skin. More importantly, highly acidic water containing chlorine gas or hypochlorous acid, which results from the electrolysis of natural water containing sodium chloride or an aqueous solution of sodium chloride, presents a strong germicidal effect and therefore may be used for the purposes of sterilization and disinfection of bacteria.

To produce alkaline and/or acidic water, various types of water electrolyzer have been developed and marketed. As is well-known, water electrolyzers are designed to operate by making use of the water electrolysis process wherein, at the anode-water interface, $OH^-$ being present in water due to electrolytic dissociation of water molecules donates electron to the anode and is thereby oxidized into oxygen gas which is then removed away from the system. As a result, the $H^+$ concentration is enhanced at the anode-water interface so that $H^+$ enriched acidic water is resulted. In a similar manner, at the cathode-water interface, $H^+$ accepts electron from the cathode and is reduced to hydrogen to form hydrogen gas which is similarly eliminated from the system so that the $OH^-$ concentration is increased at the cathode-water interface whereby $OH^-$ enriched alkaline water is generated. Further, when chlorine ion containing water such as natural water containing sodium chloride or an aqueous solution of sodium chloride is subjected to electrolysis, chlorine gas is formed at the anode-water interface and is partly dissolved into water in the form of hypochlorous acid to produce highly germicidal acidic water.

Earlier water electrolyzers have been designed to operate on the batch process. However, most of the modern water electrolyzers are of the continuous flow type. The continuous flow-type electrolyzers may be grouped into the "membrane" type and the "membraneless" type.

The membrane-type water electrolyzer is known, for example, from Japanese Utility Model Kokai Publication No. 56-80292, Japanese Patent Kokai Publication No. 58-189090 and Japanese Utility Model Kokoku Publication No. 58-47985. The membrane-type water electrolyzer includes an ion-permeable but water-impermeable membrane that is disposed in the flow path to separate a pair of electrodes from each other so as to prevent acidic water as generated along the anode from being mixed with alkaline water as produced along the cathode.

One of the problems associated with the membrane-type water electrolyzer is that the porous membrane provides a bed for bacteria and microorganism permitting them to breed when the electrolyzer is not in use. Another problem is that the membrane permits deposition of scales and deposits of water-insoluble substances such as calcium carbonate, calcium hydroxide and magnesium hydroxide. As these deposits are electrically insulating, the membrane clogged by the deposits increases the electric resistance across the electrolytic cell so that the efficiency of electrolysis is rapidly degraded.

To obviate these disadvantages, the membraneless-type water electrolyzer has been proposed in the art as disclosed, for example, in Japanese Patent Kokai Publication No. 4-284889 and Japanese Utility Model Kokai Publication No. 4-110189.

As shown, for example, in FIG. 3 of JP-4-284889, the membraneless electrolyzer is provided with a pair of electrodes which are positioned closely with one another to define therebetween a narrow flow path of a slit-shaped cross-section. The spacing between the electrode is generally less than 1 mm, usually in the order of 0.5 mm. As water to be electrolyzed is fed to flow through the narrow flow path, a laminar flow is established in the water flow under the action of viscosity acting upon the stationary surfaces of the flow path. Due to the formation of the laminar flow, acidic water generated by electrolysis at the anode-water interface flows along the anode surface without being mixed to any substantial degree with alkaline water produced at the cathode-water interface and flowing along the cathode surface. Advantageously, the membraneless electrolyzer is free from the foregoing problems involved in a membrane.

However, the problem associated with the membraneless electrolyzer is that it is extremely difficult to separate alkaline and acidic water from each other at the end of the flow path, because the flow path is very narrow (usually about 0.5 mm) and since the conventional membrane separating the electrodes has been eliminated.

JP-4-284889 proposes to separate acidic water from alkaline water by means of a baffle plate 14 protruding halfway into the downstream end of the flow path, as shown in FIG. 3 of this publication, the arrangement being such that the flow of acidic water which has flown along the anode surface impinges upon the baffle plate and is directed by the baffle plate toward an acidic water outlet.

Although this arrangement permits to separate acidic water from alkaline water to a certain degree without using the conventional membrane, it has been found that it is unable to selectively recover the thin layer of highly acidic water and strongly alkaline water flowing close to the electrodes. This is because the flow of water impinging upon the baffle plate generates an impermissible degree of turbulence which causes the layers of acidic and alkaline water so far separated in the laminar flow to be mixed with each other.

SUMMARY OF THE INVENTION

Accordingly, the primary object of the present invention is to provide an improved membraneless electrolyzer which is capable of suppressing or at least minimizing the formation of turbulence at the downstream region of the flow path at which alkaline and acidic water are to be separated from each other for independent recovery.

Another object of the invention is to provide an improved membraneless electrolyzer which is capable of selectively separating thin layer of acidic water from the remainder of the laminar flow to recover highly acidic water which may be used as germicidal water for the purposes of sterilization and disinfection of bacteria.

A still another object of the invention is to provide an improved membraneless electrolyzer which is able to recover highly alkaline water.

A further object of the invention is to optimize various hydraulic parameters of the membraneless electrolyzer to improve the efficiency of separation of alkaline and acidic water and to achieve a high degree of electrolysis.

Another object of the invention is to provide a process for water electrolysis which is capable of electrolyzing water to form flows of alkaline and acidic water without placing a membrane between the electrodes and which is yet capable of effectively separating the flows of alkaline and acidic water thus formed from each other.

In its simplest form, the membraneless electrolyzer according to the invention includes a casing having a water inlet and a narrow flow path defined by a pair of opposite surfaces. The flow path surfaces are disposed close enough to establish a laminar flow when water flows through the flow path. A pair of planar electrodes are disposed with their working surfaces in flush with the flow path surfaces to electrolyze water as it flows through the flow path in the form of a laminar flow thereby to generate in the laminar flow a layer of acidic water flowing along the anode-water interface and a layer of alkaline water flowing along the cathode-water interface. No membrane is provided between the electrodes.

The primary feature of the invention is that the layer of acidic or alkaline water is separated and stripped away from the remainder of the laminar flow while the laminar flow is sustained in the flow path. To this end, one of the flow path surfaces is provided with a slit-shaped aperture which is located upstream of the downstream end of the flow path. With this arrangement, the layer of acidic or alkaline water that has flown along one of the flow path surfaces is smoothly stripped from the remainder of the laminar flow in a direction perpendicular to the laminar flow without inducing formation of any significant turbulence.

In a preferred embodiment of the invention, the downstream end of the flow path in open communication with a first buffer storage chamber having a sufficiently large volume as compared with the flow rate of the flow path. Similarly, the slit-shaped aperture is preferably in communication with a second buffer storage chamber having a sufficiently large volume as compared with the flow rate of the aperture. These buffer storage chambers advantageously serve to reduce formation of turbulence at the point of separation.

Preferably, the depth of these buffer storage chambers is greater than 6 times of the width of the flow path and the slit-shaped aperture.

The width of the slit-shaped aperture is preferably less than 3 times of the width of the flow path.

In order to establish an intensely developed laminar flow in the flow path, the transversal extent of the flow path is preferably greater than 0.09 times, more preferably 0.14 times, of the flow rate of the flow path.

These features and advantages of the invention as well as other features and advantages thereof will become apparent from the following description.

BRIEF DESCRIPTION OF THE DRAWINGS

Throughout various drawings, like reference numerals indicate similar parts and components.

DESCRIPTION OF THE PREFERRED EMBODIMENTS

Figure 1:
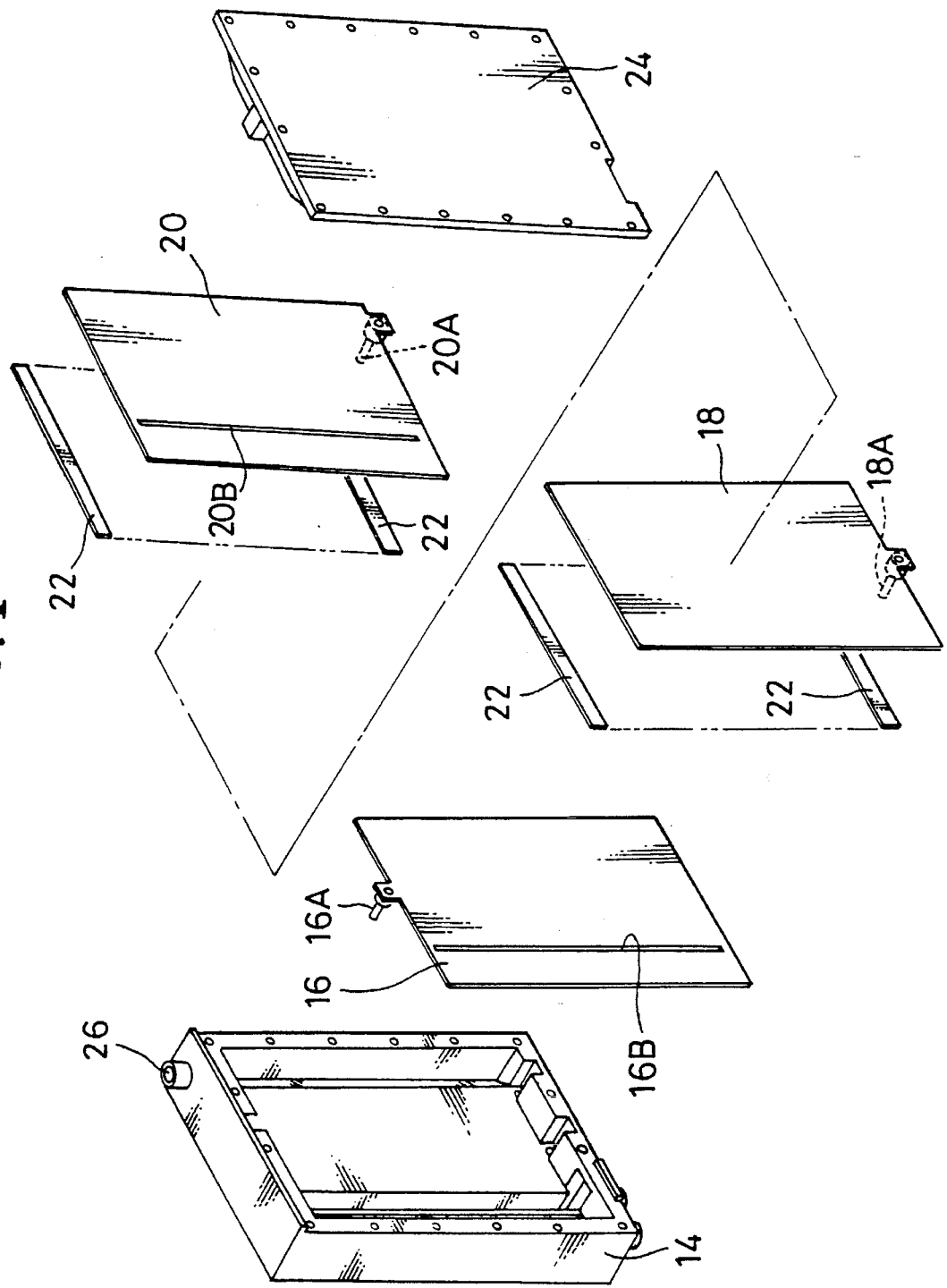
FIG. 1 is a perspective exploded view of the electrolyzer embodying the invention.
Figure 2:
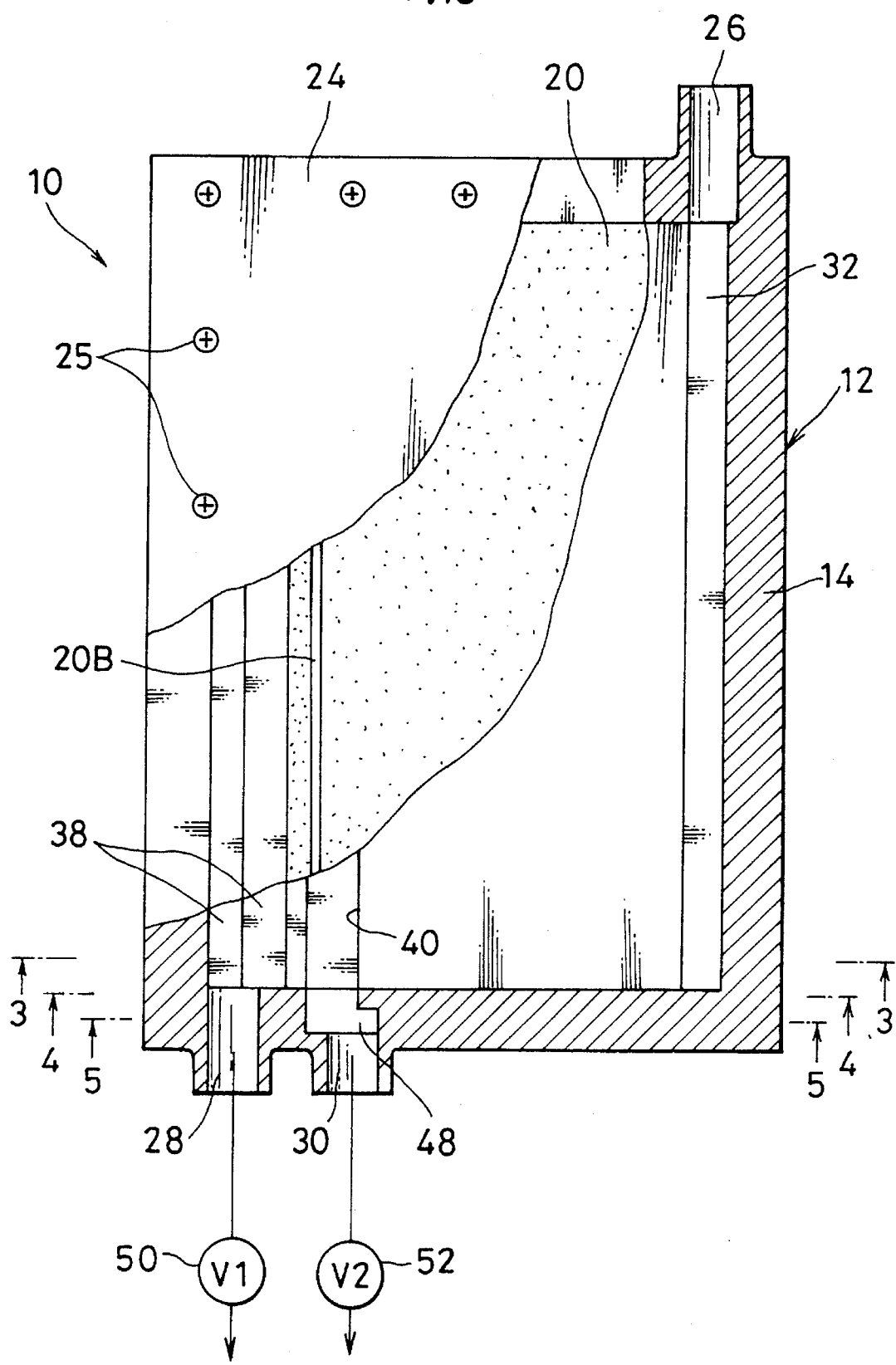
FIG. 2 is a front elevational view, partly cut away, of the electrolyzer shown in FIG. 2.

Referring first to FIGS. 1 and 2, the water electrolyzer, generally indicated by the reference numeral 10, includes a casing 12 serving as an electrolytic cell and made of pressure-resistive electrically-insulating material such as rigid plastics. In the illustrated embodiment, the casing 12 is comprised of a main body 14 and a cover 24 therefor. The main body 14 has a generally rectangular cavity in which three planar electrodes 16, 18 and 20 are received, with a plurality of spacers 22 sandwiched therebetween, as best shown in FIG. 1. The electrodes and spacers are tightly held together by the cover 24 which is liquid tightly fastened against the main body 14 by screws 25.

When a strongly acidic water is desired, an electric potential may be applied to the electrodes in such a direction that the central electrode 18 operates: as the cathode, with the lateral electrodes 16 and 20 serving as the anode. However, it is equally possible to apply the electric potential in the reverse direction where highly alkaline water is to be obtained. For the purposes of simplicity, the central electrode 18 will occasionally be referred-to hereinafter as the cathode, with the lateral electrodes 16 and 20 as the anodes. In the illustrated embodiment, the electrolyzer 10 is made in a double cell structure by arranging a pair of anodes 16 and 20 on the sides of the cathode 18 to form a pair of flow paths on the sides thereof. This is advantageous in effectively utilizing the both working surfaces of the cathode 18 for the purposes of electrolysis so that the electrolyzer may be made compact while achieving a high flow rate.

Each of the electrodes 16, 18 and 20 may be made of titanium plate coated with platinum and may have a size of about 0.5 mm in thickness, about 5 cm in width and about 13 cm in length. The spacing between the electrodes is determined by a series of spacers 22 arranged on both sides of the cathode 18 and preferably made from polytetrafluoroethylene. The spacers 22 may have a thickness of about 0.5 mm so that the electrode spacing is about 0.5 mm. As shown in FIG. 1, the electrodes 16, 18 and 20 are provided with respective terminal pins 16A, 18A and 20A which extend through associated holes in the casing main body 14 for connection to a suitable DC power source, not shown, at the rear of the casing.

As shown in FIG. 2, the casing 12 has an inlet 26 for water, a first outlet 28 and a second outlet 30. In a normal mode wherein the central electrode 18 is operated as the cathode with the lateral electrodes 16 and 20 as the anodes, the first outlet 28 functions as the outlet for alkaline water and the second outlet 30 serves as the outlet for acidic water.

Figure 3:
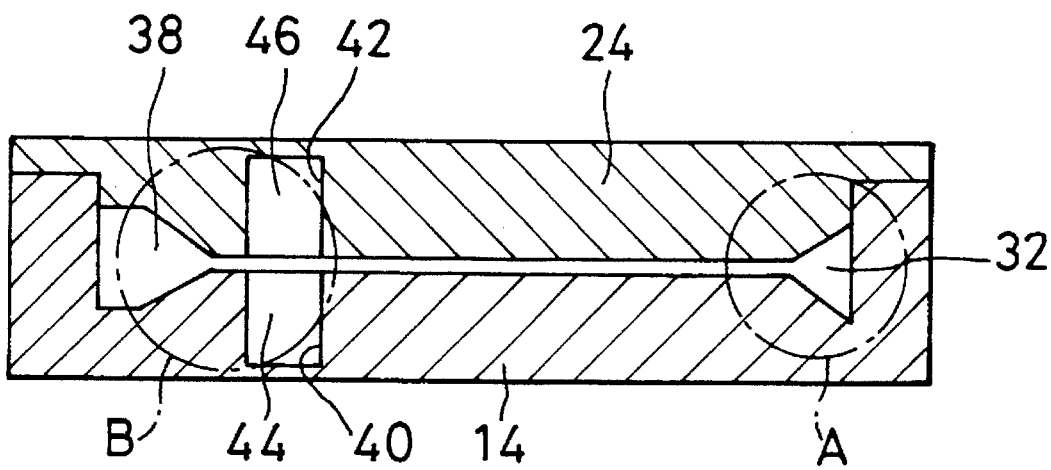
FIGS. 3–5 are cross-sectional views taken along the lines 3—3, 4—4 and 5—5, respectively, of FIGS. 2, with the electrodes and spacers being omitted in FIG. 3 for simplicity.

The water inlet 26 is in fluid communication with a water plenum or distribution chamber 32 of generally triangular cross-section which is defined by the casing main body 14 and the cover 24, as will be understood from FIG. 3. The water plenum chamber 32 extends throughout the entire vertical length of the electrodes 16, 18 and 20 so as to distribute the incoming flow of water over the entire vertical extent of the flow paths, described later. The plenum chamber 32 has a sufficiently large volume as compared with the flow rate of the flow paths and has an effective cross-sectional flow area which is substantially larger than that of the flow paths. In use, the inlet 26 may be connected by a suitable conduit to a water faucet. Alternatively, the inlet 26 may be connected to a water purifier to ensure that water is first purified and then electrolyzed to produce alkaline and/or acidic water.

Figure 6:
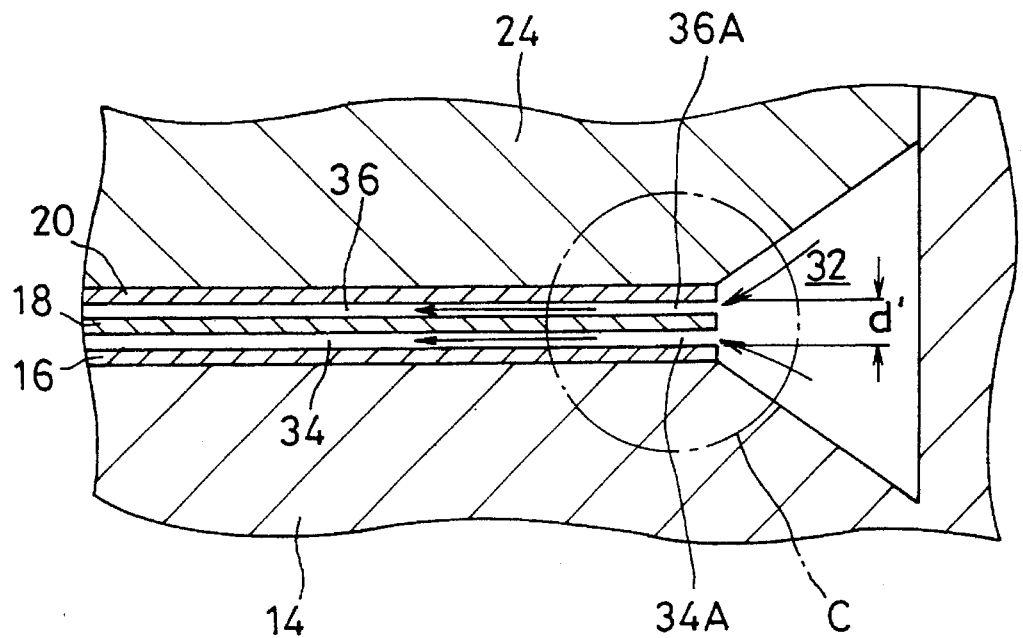
FIGS. 6 and 8 are enlarged cross-sectional views of the portions encircled by the dotted circles A and B, respectively, in FIG. 3.
Figure 8:
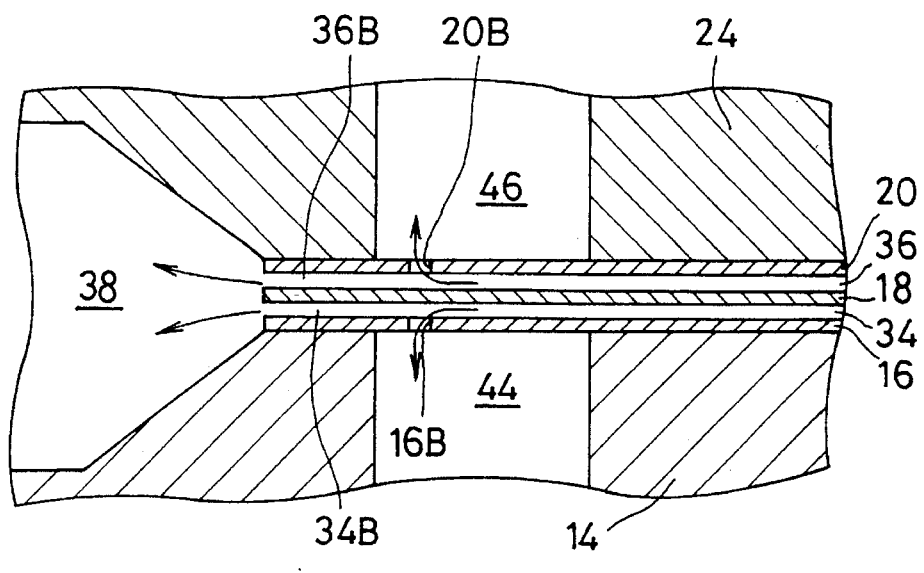

As shown enlarged in FIGS. 6 and 8, the first anode 16 concerts with the central cathode 18 to define a first flow path 34 of a slit-shaped cross-section and the second anode 20 cooperates with the cathode 18 to form a second flow path 36 of similar cross-section. Each of these flow paths 34 and 36 operates as the electrolytic chamber in which water is subjected to electrolysis as it continuously flows therethrough. In the illustrated embodiment, all the three electrodes extend throughout the entire longitudinal length of the flow paths from the upstream ends 34A and 36A thereof to the downstream ends 34B and 36B so that the surfaces defining each flow path are formed by the working surfaces of the electrodes. However, the electrodes may be made shorter and the flow paths may be formed at least in part by the inner walls of the casing 12.

Figure 7:
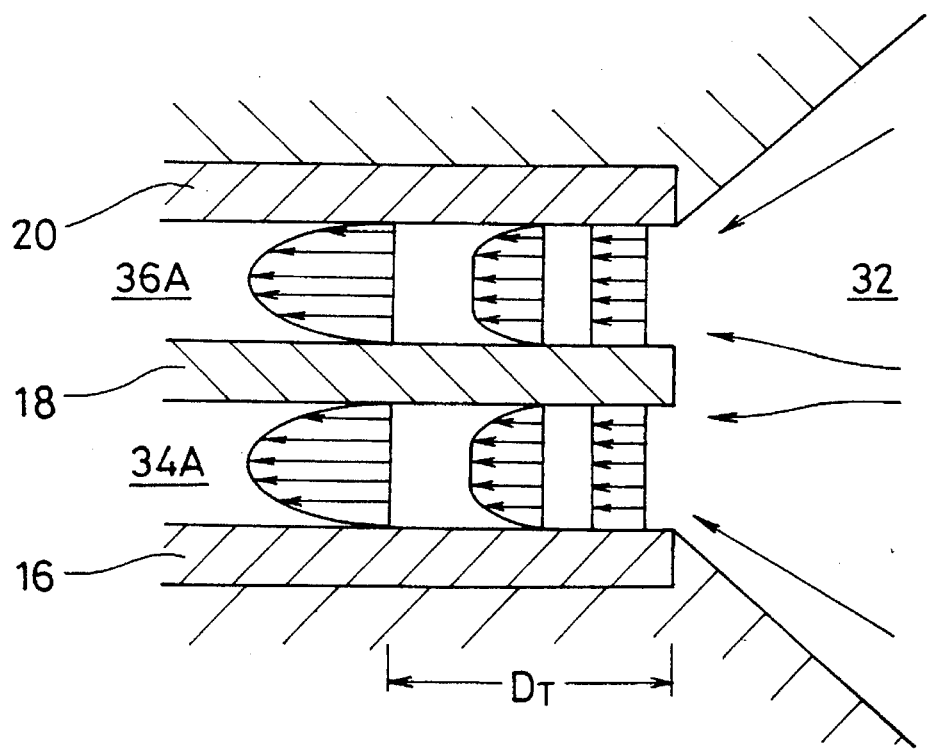
FIG. 7 is a further enlarged cross-sectional view of the portion encircled by the circle C in FIG. 6.

Each of the flow paths 34 and 36 may be divided into a plurality of horizontal sub-passages by the horizontal spacers 22 numbering five, for example. As the upstream ends 34A and 36A of the flow paths are in open communication with the plenum chamber 32, the flow of water entering the inlet 26 and flowing down in the plenum chamber 32 will be distributed over the sub-passages to flow therethrough in the horizontal direction as shown in FIGS. 6 and 7. As the electrode spacing is so small, the flow of water flowing through each flow path will undergo the effect of viscosity acting on the opposite surfaces defining the flow path so that a laminar flow is established therein as shown in FIG. 7 after running a certain inlet or entrance length DT.

To establish a well-developed laminar flow, the vertical extent of the flow paths 34 and 36, which in the illustrated embodiment is equal to the vertical length of the electrodes, is made preferably greater than 0.09 times, more preferably 0.14 times, of the flow rate of each flow path, as described later in more detail with reference to FIGS. 18–22.

As shown in FIGS. 3 and 8, the downstream ends 34B and 36B of the flow paths are open into a buffer storage chamber or alkaline water recovery chamber 38 which is in communication with the alkaline water outlet 28. The buffer storage chamber 38 has a generally pentagonal cross-section and is defined by the casing main body 14 and the cover 24. Similar to the plenum chamber 32, the buffer storage chamber 38 extends throughout the entire vertical length of the electrodes and, hence, throughout the entire vertical extent of the flow paths 34 and 36. The buffer storage chamber 38 has a sufficiently large volume with respect to the flow rate of the flow paths 34 and 36 and has an effective cross-sectional flow area substantially larger than that of the flow paths to ensure that the laminar flow as developed in the flow paths and as issuing from the downstream ends thereof smoothly flows into the buffer storage chamber 38 without causing substantial turbulence in the laminar flow flowing along the flow paths. For reasons described later with reference to FIGS. 13–15, the depth of the buffer storage chamber 38 as measured in the direction of the laminar flow is preferably made greater than 6 times of the electrode spacing, i.e., the thickness of each flow path.

Figure 4:
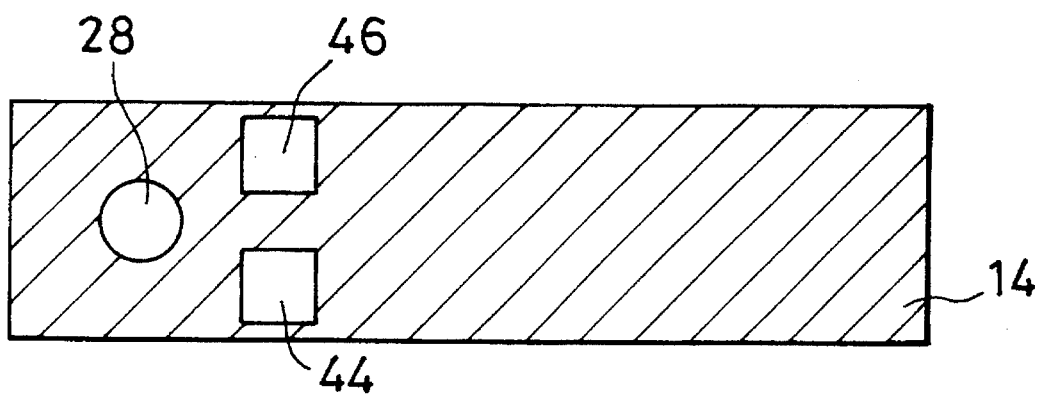
Figure 5:
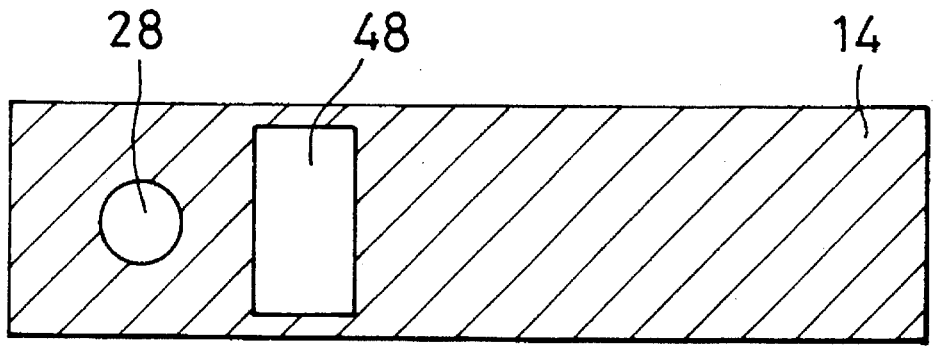

As shown in FIG. 3, the casing main body 14 and the cover 24 are provided, respectively, with grooves 40 and 42 extending throughout the vertical length of the anodes 16 and 20 to form therewith a pair of buffer chambers or acidic water recovery chambers 44 and 46. The lower ends of these buffer chambers 44 and 46 are merged into a passage 48 formed in the main body 14 as shown in FIGS. 4 and 5 and are thereafter communicated with the acidic water outlet 30 as best shown in FIG. 2.

The anode plates 16 and 20 are provided, respectively, with slit-shaped apertures or ports 16B and 20B, as shown in FIGS. 1 and 8, to communicate the flow paths 34 and 36 with the acidic water buffer chambers 44 and 46, respectively. These apertures 16B and 20B are intended to separate or exfoliate the extremely thin surface layer of strongly acidic water, which is flowing along the anode surface, from the remainder of the laminar flow in a direction perpendicular to the direction of the laminar flow without causing any substantial turbulence to occur at the point of separation, as described later with reference to FIG. 11. To this end, the apertures 16B and 20B are located at such a distance from the downstream ends 34B and 36B of the flow paths sufficiently upstream thereof to ensure that the laminar flow is sustained in the region of the flow paths situated downstream of the apertures 16B and 20B.

The width of respective apertures 16B and 20B is preferably less than 3 times of the electrode spacing, as described later in more detail with reference to FIGS. 16 and 17. Similar to the buffer storage chamber 38 for alkaline water, each of the buffer chambers 44 and 46 for acidic water has a sufficiently large volume with respect to the flow rate of respective apertures 16B and 20B and has an effective cross-sectional flow area substantially larger than that of the associated apertures 16B and 20B. The depth of the buffer storage chambers 16B and 20B as measured perpendicular to the flow paths is preferably greater than 6 times of the width of the apertures 16B and 20B.

In the embodiment illustrated, the slit-shaped apertures 16B and 20B are formed in the downstream part of the anode plates 16 and 20. It will be understood, however, that these apertures 16B and 20B may be defined wholly or partly by the casing main body 14 and the cover 24 when shorter anode plates 16 and 20 are used.

In use, the inlet 26 of the electrolyzer 10 may be connected to a conventional faucet to receive a supply of tap water under pressure. Alternatively, an aqueous solution of sodium chloride may be supplied to the inlet 26 where germicidal acidic water is desired. The alkaline water outlet 28 and the acidic water outlet 30 may be connected, respectively, to conventional flow control valves 50 and 52, as schematically shown in FIG. 2, so as to control the total flow rate of the electrolyzer as well as to proportion the flow rates through respective outlets 28 and 30. When the electrolyzer 10 is used for domestic purposes, the flow control valves may be adjusted such that the total flow rate is, for example, 5 l/min.

As water is admitted, incoming water from the inlet 26 will be uniformly distributed by the water plenum chamber 32 over the entire vertical extent of the flow paths 34 and 36 and then flow into the flow paths in the horizontal direction while forming a laminar flow as described before.

An electric potential of DC 12 V, for example, may be applied between the cathode 18 and the anodes 16 and 20 to carry out electrolysis of water. As the flow paths 34 and 36 and the associated elements are symmetric with respect to the plane of central electrode 18, the mode of operation of the electrolyzer as related only to the flow path 36 will be described below.

Figure 9:
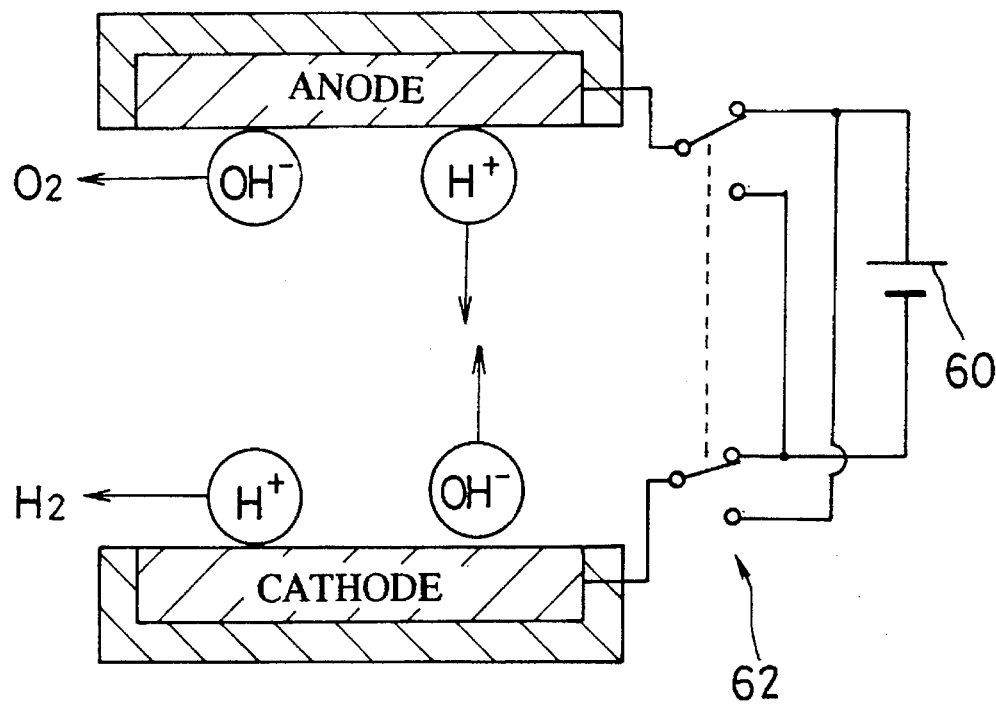
FIGS. 9 and 10 are schematic representation of the process of electrolysis carried out by the electrolyzer embodying the invention.

Referring to FIG. 9 wherein the process of electrolysis is schematically shown, upon application of an electric potential from a DC power source 60 by turning on a switch 62, $OH^-$ being present at the anode-water interface will donate electron to the anode 20 and will be oxidized into oxygen forming oxygen gas. As oxygen gas is liberated into the atmosphere, the $H^+$ concentration will be enhanced at the anode-water interface so that $H^+$ enriched acidic water is resulted. When aqueous solution of sodium chloride is subjected to electrolysis, highly acidic germicidal water containing chlorine gas or hypochlorous acid is produced at the anode-water interface.

At the cathode-water interface, $H^+$ will accept electron from the cathode 18 and will be reduced into hydrogen to form hydrogen gas. The $OH^-$ concentration will be increased as hydrogen gas quits water so that $OH^-$ enriched alkaline water is generated at the cathode-water interface.

$H^+$ and $OH^-$ concentrated in this manner at respective electrode-water contact will begin to migrate away from the associated electrodes under the process of ion diffusion and electrophoresis. According to the analysis and calculation made by the present inventors, it was found that, under the conditions wherein the electrode spacing is 0.5 mm and the voltage potential is 12 V, the velocity of migration of $H^+$ is 5.9 mm/sec in contrast to the velocity of migration of $OH^-$ of 3.6 mm/sec so that $H^+$ has much higher mobility than $OH^-$.

Figure 10:
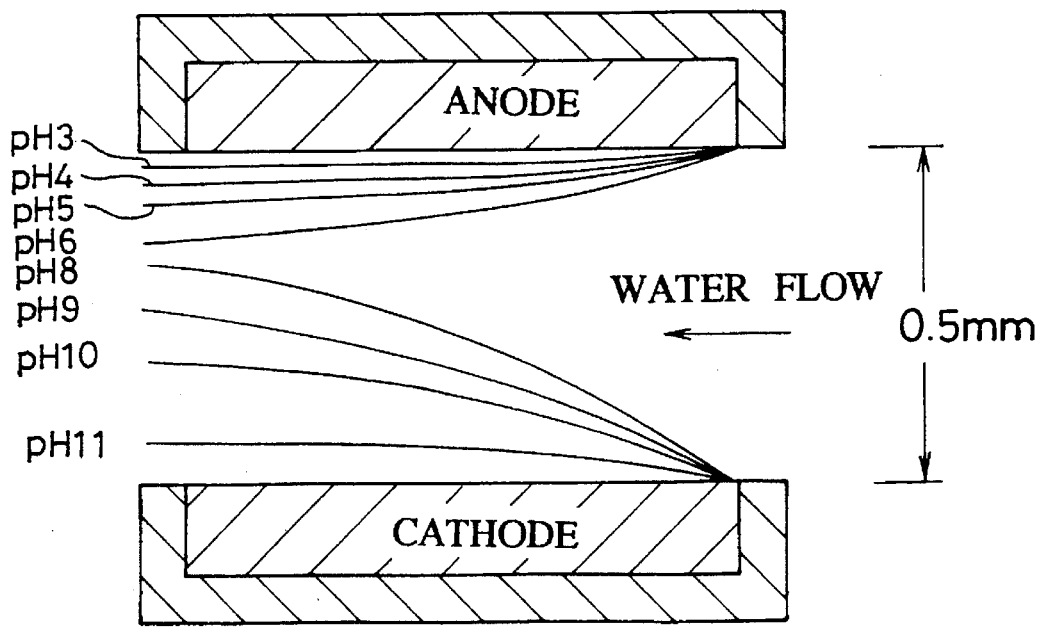

Accordingly, $H^+$ once concentrated at the anode-water interface will migrates away from the anode much faster than $OH^-$. As a result, the thickness of the layer of acidic water having the least pH value and flowing along the anode surface will be very small as compared with the thickness of the layer of alkaline water having the maximum pH. FIG. 10 schematically illustrates the estimated pH distribution. It will be noted from FIG. 10 that, given the electrode spacing of 0.5 mm, the layer of acidic water of pH 3 is extremely thin.

Figure 11:
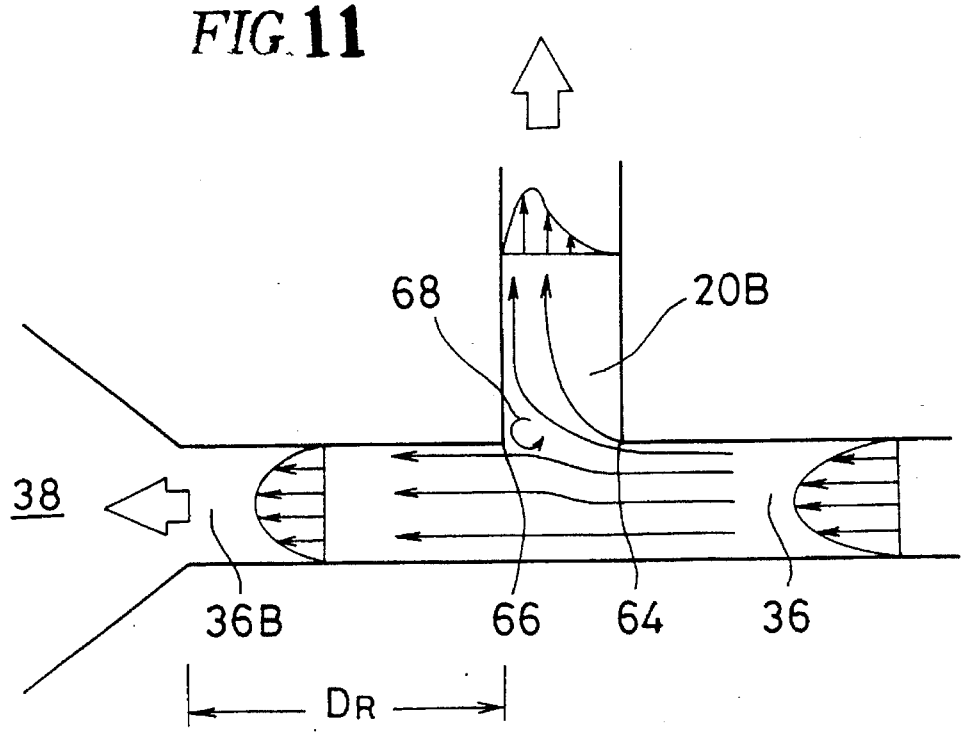

According to the invention, the thin layer of acidic water having low pH value can be efficiently separated from the remainder of the laminar flow without being substantially mixed with adjacent layers of water having higher pH value so that highly acidic water can be recovered through the aperture 20B, as schematically shown in FIG. 11.

Referring to FIG. 11, the laminar flow as established in the flow path 36 will flow past the leading edge 64 and the trailing edge 66 of the aperture 20B. As water flows past the leading edge 64, the thin layer of highly acidic water will begin to enter the aperture 20B in a direction perpendicular to the main stream of the laminar flow and will be recovered from the acidic water outlet 30. When acidic water in the order of pH 3 is desirable, the flow control valves 50 and 52 may be adjusted such that the ratio of flow rate at the acidic water outlet 30 with respect to the flow rate at the alkaline water outlet 28 is about 1:4.

The critical region at which the thin layer of highly acidic water is finally separated or stripped from the remainder of the laminar flow will be located in the close vicinity of the trailing edge 66 of the aperture 20B.

The remainder of the laminar flow then flows through the final length $D_R$ of the flow path located downstream of the aperture 20B. The laminar flow will be substantially maintained therethrough because of the narrow electrode spacing. Upon entry into the alkaline water buffer chamber 38, turbulence will be generated therein so that the pressure variation due to turbulence will be propagated backwards and reflected in the upstream region of the flow path, in particular, the critical region at the trailing edge 66.

However, because the aperture 20B is spaced upstream of and away from the alkaline water buffer chamber 38 by a distance $D_R$ and since the laminar flow is sustained in the region downstream of trailing edge 66 by the provision of the final length $D_R$, the critical region at the trailing edge 66 will be substantially exempt from the pressure variation due to turbulence occurring in the buffer chamber 38. Accordingly, formation of turbulence 68 at the trailing edge 66 is minimized whereby thin layer of strongly acidic water is separated from the remainder of the laminar flow without being mixed in any undesirable degree with water layer having higher pH value.

When weak acid water is required, the flow control valves 50 and 52 may be so regulated that the flow rate through the acid water outlet 30 is increased.

In another mode of operation wherein highly alkaline water is desired, the switch 62 may be changed to a position opposite to that shown in FIG. 9 to cause the central electrode 18 to operate as the anode and the lateral electrodes 16 and 20 as the cathode. In this mode, highly alkaline water will be recovered at the outlet 28, with acidic water issuing from the outlet 28. In particular, when aqueous solution of sodium chloride is subjected to electrolysis, highly alkaline water having a pH value greater than 11 can be recovered at the outlet 28. Such highly alkaline water may be used as detergent for the cleansing of articles such as dishes soiled by organic substances. The articles may advantageously be subjected thereafter to sterilization with the highly acidic water obtained by the same electrolyzer.

EXAMPLE 1

Figure 12:
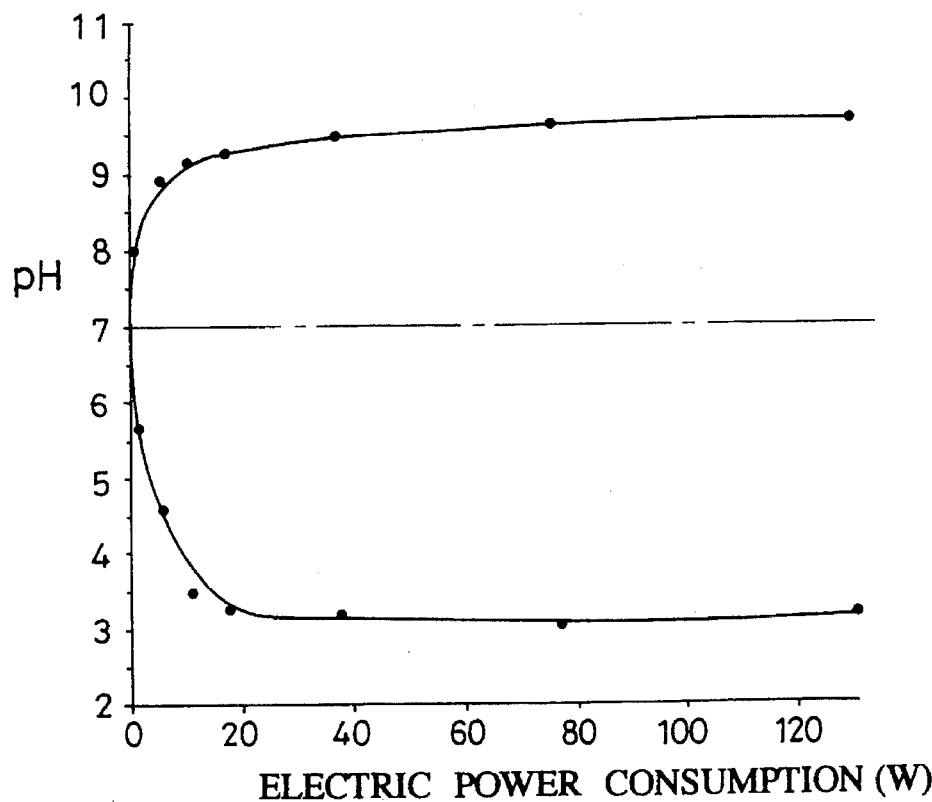
FIG. 12 is a graph showing the results of Example 1.

An electrolyzer 10 as shown in the foregoing drawings was prepared. Each electrode had a thickness of 0.5 mm, a width of 5.8 cm and a length of 13.5 cm. The thickness of the spacers 22 was 0.5 mm so that the electrode spacing was equal to 0.5 mm. The slit-shaped apertures 16B and, 20B each had a width of 0.5 mm. The final length $D_R$ downstream of the apertures was 0.5 mm. The flow rate at the alkaline water outlet 28 was adjusted to be 4 l/min with the flow rate at the acidic water outlet 30 to be 1 l/min. The electrolyzer was tested by varying the voltage applied between the cathode 18 and the anodes 16 and 20 and the pH value of water issued from the alkaline water outlet and acidic water outlet, respectively, was measured. The results are shown in the graph of FIG. 12 wherein the upper curve represents the pH variation of alkaline water and the lower curve indicates the pH variation of acidic water. It will be noted from the graph that at a power consumption of about 20 W, strongly acidic water having a pH value as low as 3 was obtained.

EXAMPLE 2

Figure 13:
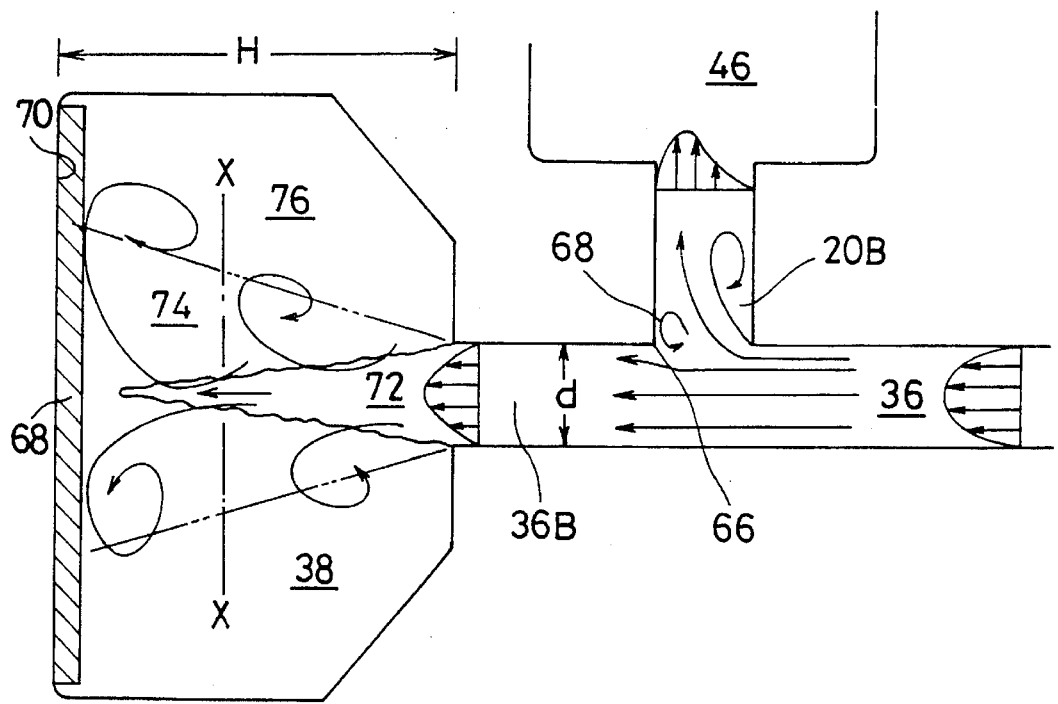
FIGS. 11 and 13 are enlarged schematic cross-sectional views showing the terminal region of one of the flow path shown in FIG. 8.

An electrolyzer was prepared which was similar in size to that used in Example 1 except that the width of the apertures 16B and 20B was 1 mm. Testing was conducted to see the effect that the depth of the buffer storage chambers 38, 44 and 46 may affect upon the effectiveness of separation of acidic water. To this end, the electrolyzer was tested by varying the depth of the buffer storage chambers 38, 44 and 46. This was done by inserting a shim plate 68 of varying thickness in front of the end wall 70 of the buffer storage chamber 38, as shown in FIG. 13 wherein only one of the flow paths is schematically illustrated. The depth of the buffer storage chambers 44 and 46 for acidic water was changed in a similar manner. Under the flow rate conditions of 4 l/min for alkaline water and 1 l/min for acidic water and by applying DC 12 V between the electrodes, the pH value of alkaline water at the outlet 28 was measured for varying depth of the buffer storage chambers. The results are shown in the graphs of FIGS. 14 and 15 wherein FIG. 14 shows the pH variation in response to the change in the depth of the buffer storage chamber 38 for alkaline water and FIG. 15 shows the pH variation in response to the change in the depth of the buffer storage chambers 44 and 46 for acidic water.

Figure 14:
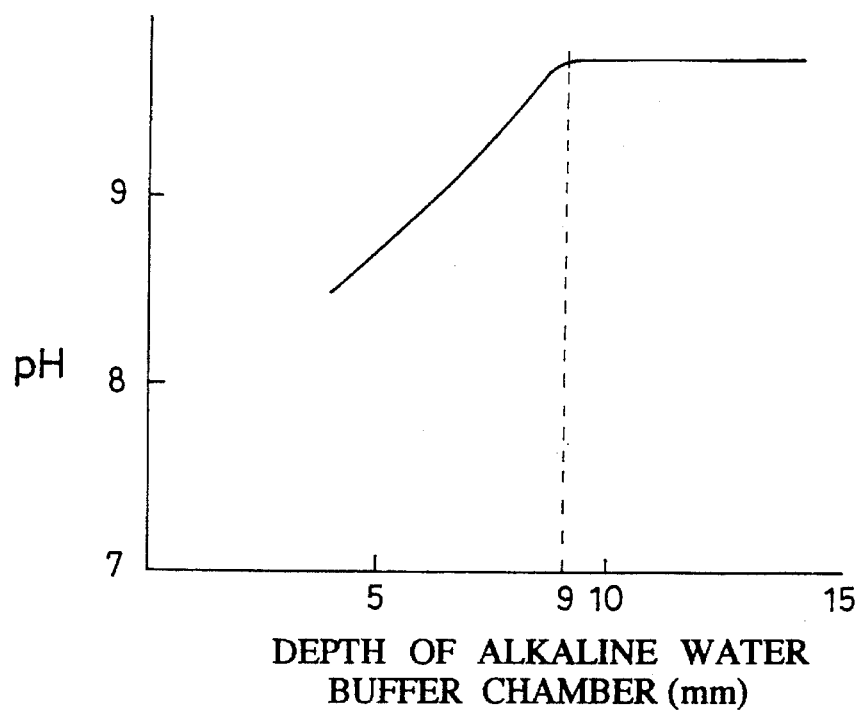
FIGS. 14 and 15 are graphs showing the results of Example 2.
Figure 15:
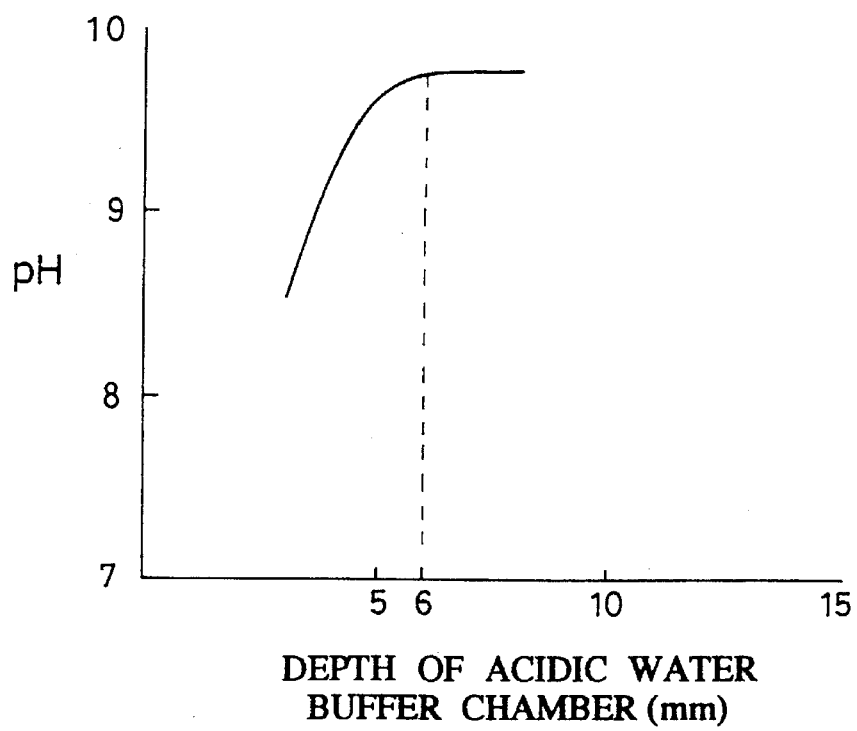

The graph of FIG. 14 indicates that, when the depth of the buffer storage chamber 38 is less than 9 mm, alkaline water having a sufficiently high pH is not obtainable at the alkaline water outlet 28. This, in turn, means that highly acidic water is not obtained at the acid water outlet 30.

The effect of the buffer chamber depth may be explained as follows. Given the flow rate of alkaline water to be 4 l/min, the average velocity of the laminar flow in the downstream end of each flow path is as high as about 50 cm/sec. Referring to FIG. 13, the flow is ejected into the buffer storage chamber 38 in the form of a jet 72 and looses its velocity as it is mixed with surrounding mass of water. When the depth H of the chamber 38 is sufficiently longer than, the jet 72, a mixing region 74 and an outer stagnant region 76 will be formed in the chamber 38. However, if the depth H of the chamber 38 is shorter than the length of the jet 72 so that the end wall 70 of the chamber 38 comes closer to the flow path end as shown by the imaginary line X—X, the end wall 70 will serve as a baffle plate against the jet 72. This will cause the pressure in the jet to pulsate. The pressure pulsation, in turn, results in the pressure variation at the trailing edge 66 of the aperture 22C so that the scale of turbulence 68 is enlarged. This hinders effective separation of acidic water as described before.

Obviously, the results shown in the graph of FIG. 14 indicate that, with the buffer chamber depth H greater than about 9 mm, an optimum separation efficiency is obtained. As the thickness of the electrodes and the electrode spacing d, respectively, was 0.5 mm, the distance d' (FIG. 6) between the inner surfaces of the anodes 16 and 20 was 1.5 mm. As the buffer chamber depth H of 9 mm is equal to 6 times of the distance d', it is considered that the separation efficiency is optimized if the buffer chamber depth is greater than 6 times of the electrode spacing d.

Similarly, the graph of FIG. 15 means that, when the depth of the buffer storage chambers 44 and 46 for acidic water is less than 6 mm, alkaline water of sufficiently high pH is not obtainable at the alkaline water outlet 28 and, hence, that acidic water of adequately low pH is not obtainable at the acid water outlet 30. As the width of the apertures 16B and 20B was 1 mm, it can be concluded that an optimum separation efficiency is obtainable if the depth of the buffer storage chambers 44 and 46 for acidic water is made greater than 6 times of the aperture width.

EXAMPLE 3

A plurality of anode plates 16 and 20 having varying width of the apertures 16B and 20B were prepared and assembled in sequence into the electrolyzer used in Example 1. The electrode spacing d was held constant throughout various experiments. Under the flow rate conditions of 4 l/min for alkaline water and 1 l/min for acidic water, the pH value at the alkaline water outlet 28 and the acidic water outlet 30 was monitored while applying DC 12 V between the electrodes. The results are shown in the graph of FIG. 16 wherein the abscissa represents the ratio of the width R of the apertures 16B and 20B with respect to the electrode spacing d and wherein the upper curve represents the pH variation of alkaline water and the lower curve indicates the pH variation of acidic water.

Figure 16:
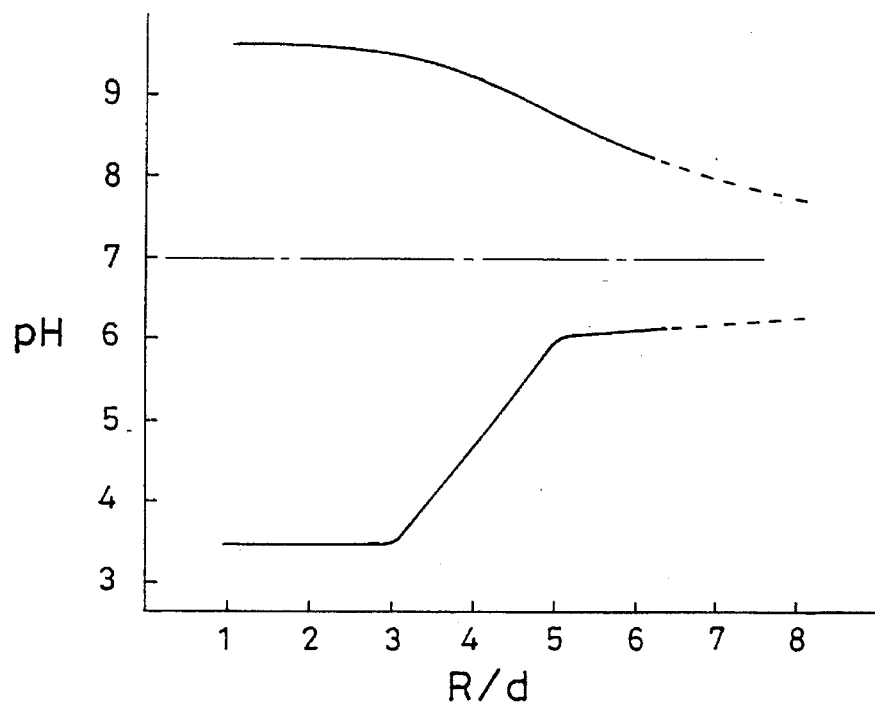
FIG. 16 is a graph showing the results of Example 3.
Figure 17:
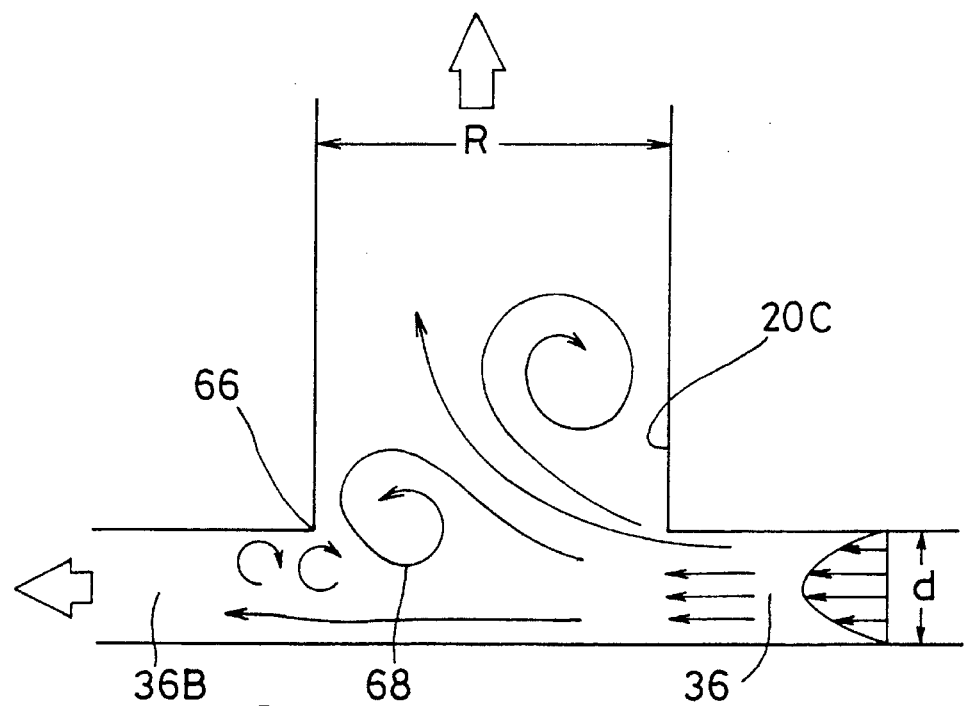
FIG. 17 is an enlarged schematic cross-sectional view similar to FIG. 11.

As will be noted from graph of FIG. 16, with increasing width R of the apertures 16B and 20B and, hence, with increasing ratio R/d, the pH value of alkaline and acidic water approaches to the neutral. This implies that with wider apertures 16B and 20B, significant turbulence 68 is developed at the region of the trailing edge 66 of the apertures as schematically shown in FIG. 17 thereby resulting considerable mixing of acidic and alkaline water at the critical region. It will be noted that when the width R of said aperture is less than 3 times of the electrode spacing d, a high degree of separation is achieved.

Figure 18:
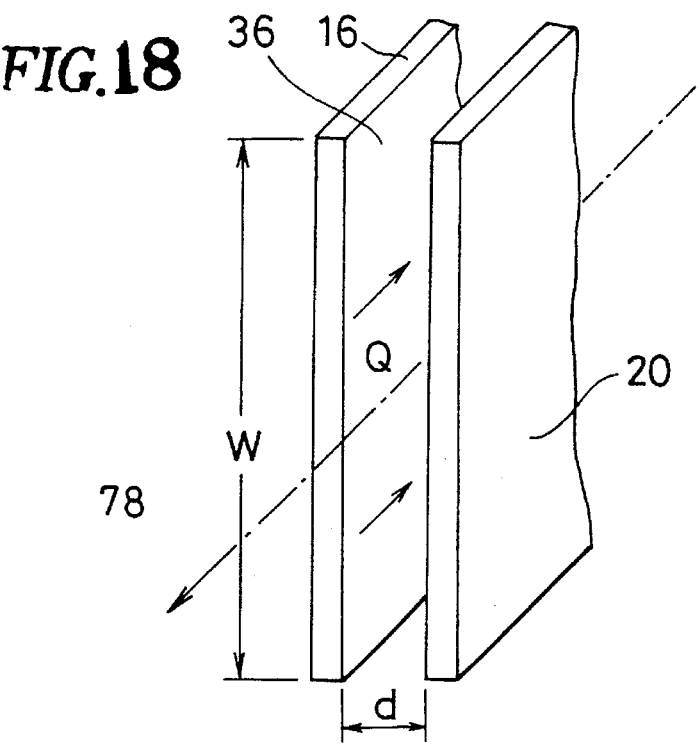
FIG. 18 is a schematic representation of one of the flow path.

Referring next to FIG. 18, the other feature of the present invention relating to the preferred relationship between the vertical extent of the flow paths 34 and 36 and the flow rate will be described.

It is empirically known in the art of fluid dynamics that, as long as a flow in a circular pipe is concerned, a laminar flow undergoes transition into a turbulent flow when the Reynolds number Re exceeds about 2,300. For a flow in a circular pipe, the Reynolds number Re is expressed as $$Re = vD/n \quad (1)$$

where v is the average velocity of fluid,

D is the hydraulic diameter of the circular pipe, and n is the kinematic viscosity of fluid.

Contrary to a flow in a circular pipe, no theoretical analysis has been made in the art with regard to the generation of turbulence in a flow path having a slit-shaped cross-section as in the case of the electrolyzer according to the invention.

Referring to FIG. 18 wherein only the flow path 36 defined by the electrodes 16 and 20 is schematically shown, and assuming that the vertical extent of the flow path 36 as measured perpendicular to the axis 78 of the flow path and parallel to the planes of the electrodes is W (in cm), with the electrode spacing to be d (in cm) and the flow rate to be Q (in cm$^3$/sec), the velocity v of water flowing through the flow path 36 is $$v = Q/Wd \quad (2)$$

since the cross-sectional flow area of the flow path is equal to Wd.

it is known that, for a flow in a circular pipe, the hydraulic diameter D is equal to 4 times of the hydraulic mean radius, which is defined as the cross-sectional flow area divided by the wetted periphery. To apply this fact upon the flow path 36 of the electrolyzer according to the invention, the hydraulic diameter D of the flow path 36 is $$D = 4Wd/2(d+W) = 2dW/(d+W) \quad (3)$$

In the electrolyzer according to the invention, the electrode spacing d may be in the order of 0.5 mm so that it can be regarded that the vertical extent W of the flow path is sufficiently large as compared with the electrode spacing. Accordingly, the following approximative equation is resulted.

$$d + W \approx W \quad (4)$$

By incorporating Equation (4) into Equation (3), $$D = 2dW/W = 2d \quad (5)$$

By incorporating Equations (2) and (5) into Equation (1), the Reynolds number Re for the flow path 36 is obtained:

$$\begin{aligned} Re &= vD/\nu \\ &= (Q/Wd) \cdot 2d/\nu \\ &= 2Q/\nu W \end{aligned} \quad (6)$$

As the threshold or transitional Reynolds number necessary to establish a laminar flow in a circular pipe is Re=2,300 as described before, the Reynolds number Re according to Equation (6) must be smaller than 2,300 in order to ensure that a laminar flow is established in the flow path 36 of the electrolyzer according to the invention. Thus, $$Re = 2Q/\nu W < 2,300 \quad (7)$$

By rewriting Formula (7) and by substituting $\nu = 0.01$ cm$^2$/sec for $\nu$, $$W > 2Q/2300\nu = 0.087Q \quad (8)$$

where Q is expressed in cm$^3$/sec and W is expressed in cm.

From Formula (8), it is found that the vertical extent W of the flow path 34 or 36 must be greater than 0.087 times, more roughly 0.09 times, of the flow rate Q in order to establish a sufficiently developed laminar flow.

EXAMPLE 4

Experiments were carried out in an attempt to verify the above-mentioned findings. An electrolyzer having a single flow path defined by a pair of electrodes was prepared. The vertical extent W of the flow path was 5 cm. Other dimensional parameters of the electrolyzer were similar to those of the electrolyzer used in Example 1. While varying the flow rate, the pH at the alkaline water outlet was measured. The results are given in the graph of FIG. 19.

Figure 19:
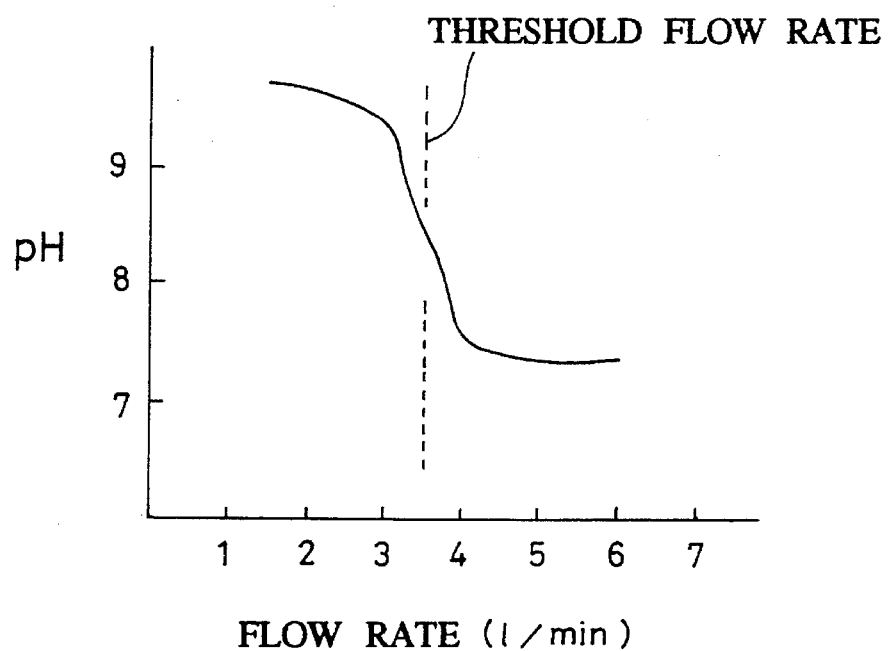
FIGS. 19–22 are graphs showing the results of Example 4.

It will be observed from the graph of FIG. 19 that as the flow rate exceeds 3 l/min and approaches 4 l/min, the pH at the alkaline water outlet steeply drops, indicating a sudden decrease in the efficiency of electrolysis. From Formula (8) above, the threshold flow rate to establish a laminar flow in a flow path having a vertical extent of 5 cm is about 3.5 l/min. Clearly, this value is in commensurate with the tendency shown in FIG. 19. It is therefore considered that when the width W of the flow path is less than 0.09 times of the flow rate, a substantial turbulence is generated in the flow path.

Figure 20:
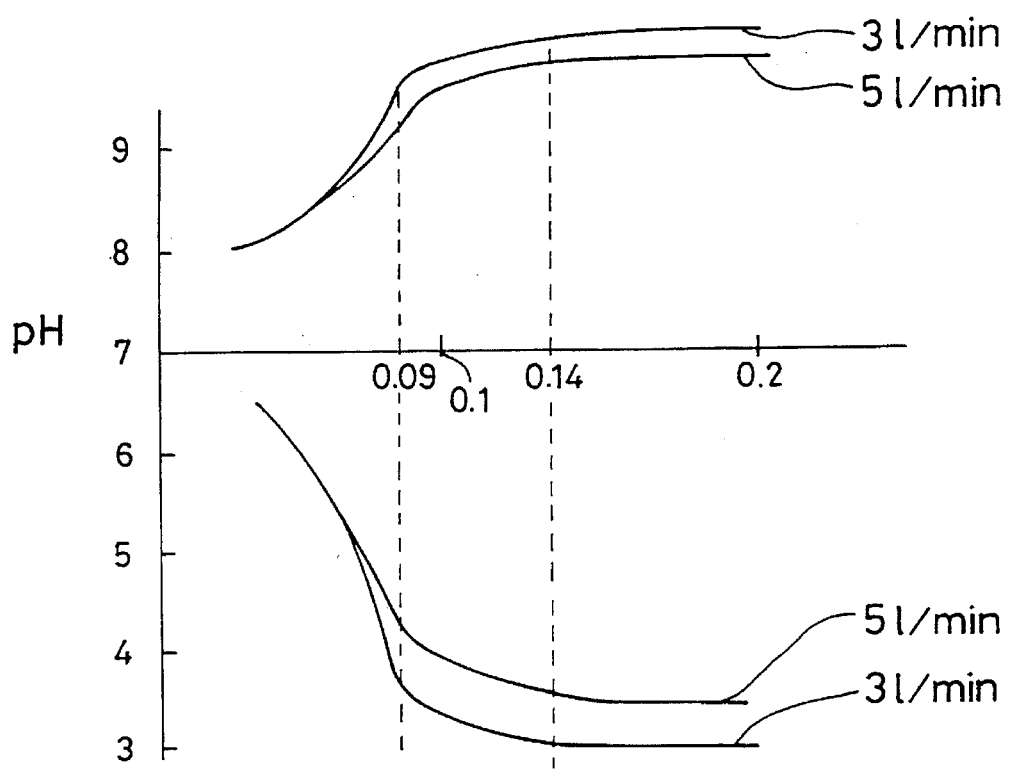

Further experiment was conducted at the flow rates of 3 l/min and 5 l/min, respectively, while varying the vertical extent W of the flow path by inserting into the flow path a strip of silicone rubber having a varying cross-section. A constant electric power of 3 A was applied between the electrodes regardless of the change in the effective working surface area of the electrodes due to variation in the vertical extent W of the flow path. The pH value at the acidic and alkaline water outlets were measured. The results are shown in the graph of FIG. 20 wherein the abscissa represents the vertical extent W of the flow path as divided by the flow rates (3 l/min and 5 l/min, respectively) and the ordinate indicates the pH level of acidic and alkaline water. As is noted from the graph of FIG. 20, regardless of the flow rate, the performance of the electrolyzer to produce acidic and alkaline water is degraded as the vertical extent W becomes less than 0.09 times of the flow rate. It will also be noted from the graph that when the vertical extent W exceeds about 0.14 times of the flow rate, strongly acidic and alkaline water is generated. Therefore, it is practical to design such that the vertical extent W of the flow path is greater than 0.14 times of the flow rate.

Figure 21:
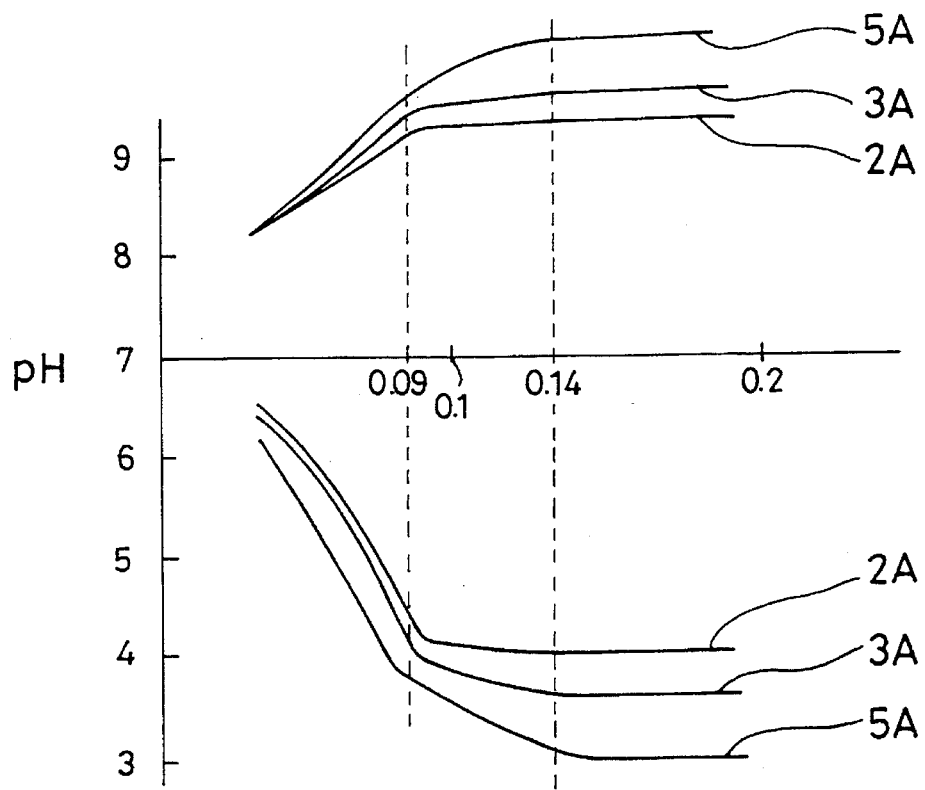

The graph of FIG. 21 shows the results of similar test in which electrolysis was carried out at varying electric power of 2, 3 and 5 A, respectively, under a constant flow rate of 5 l/min. In the graph of FIG. 21, the abscissa similarly indicates the vertical extent W of the flow path as divided by the flow rate. It will be noted that with higher electric power, the degree of electrolysis is enhanced. However, it is confirmed that the performance is improved as the vertical extent W of the flow path becomes greater than 0.09 times, more specifically, 0.14 times of the flow rate.

Figure 22:
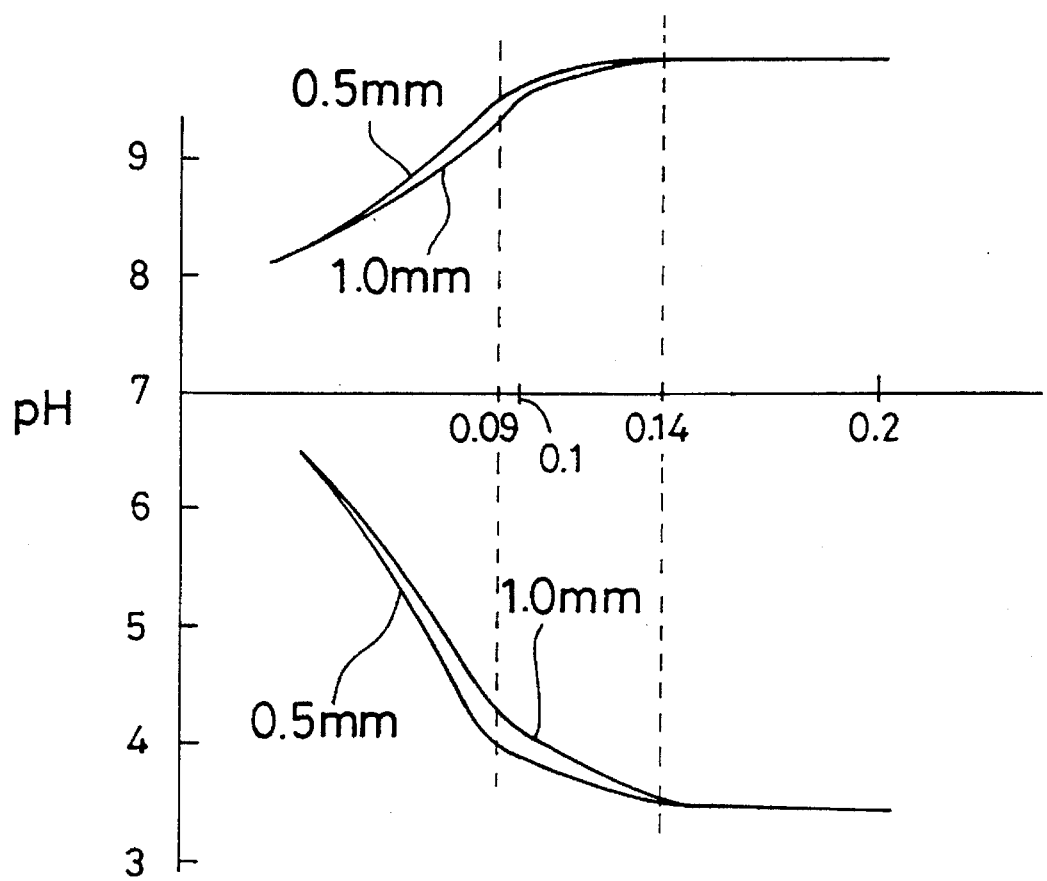

The graph of FIG. 22 shows the results of another test conducted with the electrode spacing of 0.5 mm and 1.0 mm, respectively, at a constant electric power of 3 A. The vertical extent W of the flow path was varied in a similar manner. The flow rate was fixed at 5 l/min. With larger electrode spacing, the degree of electrolysis is lowered as shown. However, it will be noted that a higher performance is achieved as the vertical extent W of the flow path exceeds 0.09 times, preferably 0.14 times, of the flow rate.

Figure 23:
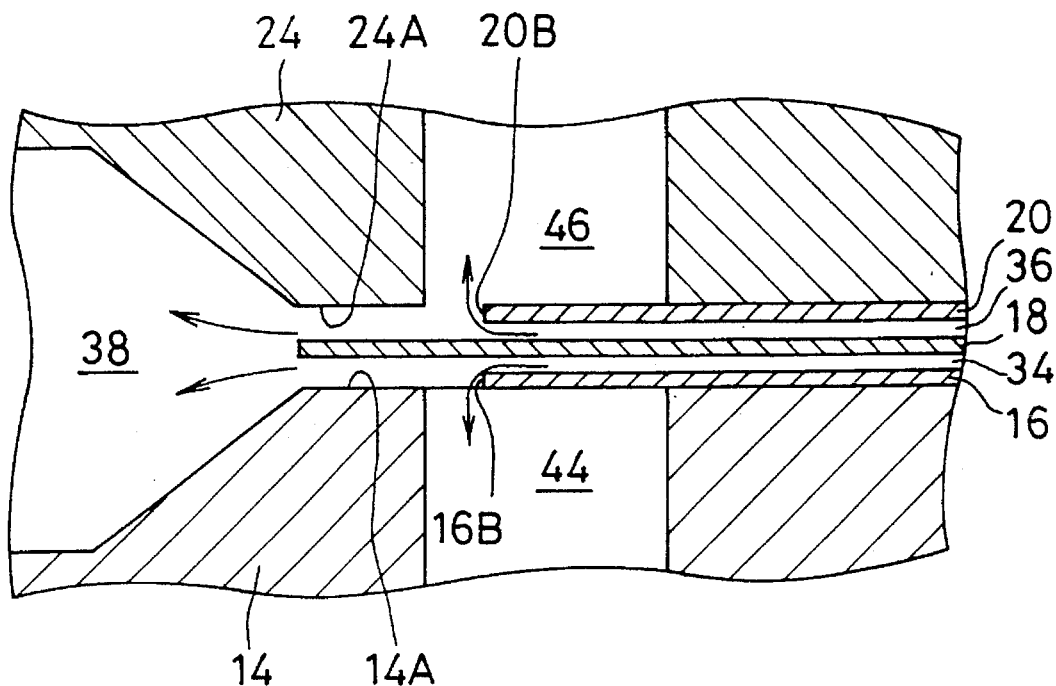
FIGS. 23–26 are cross-sectional views showing the modified structures of the flow path; and, FIG. 27 is a view similar to FIG. 1 but showing the simplified form of the electrolyzer embodying the invention.
Figure 24:
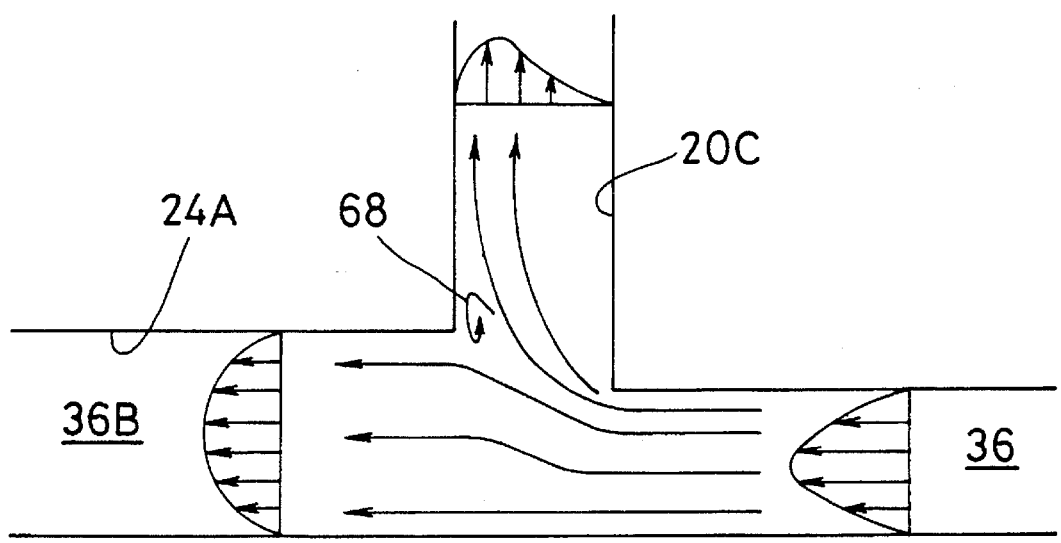
Figure 25:
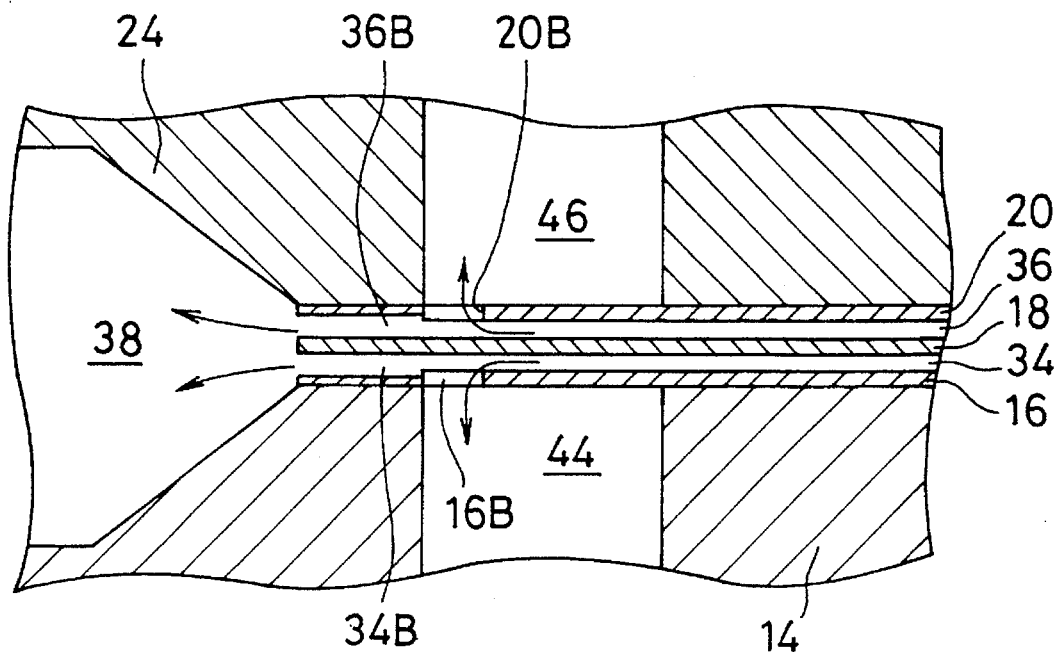
Figure 26:
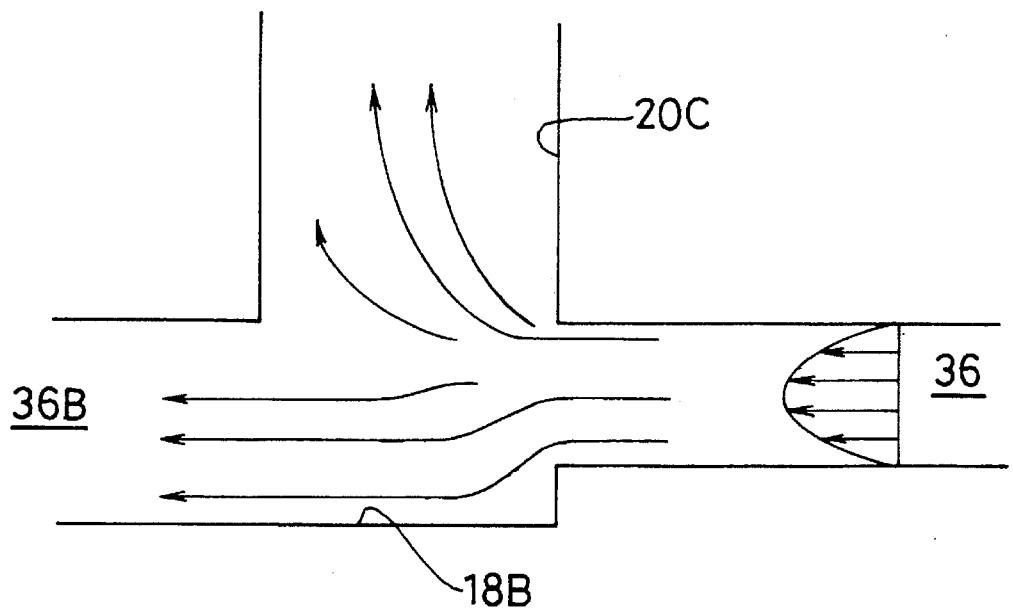

FIGS. 23–26 illustrate the modified structures of the flow paths. Referring to FIG. 23, the outer electrodes 16 and 20 terminate, respectively, at the acid water separation apertures 16B and 20B whereas the central electrode 18 extends down to the central buffer storage chamber 38. The downstream ends 34B and 36B of the flow paths 34 and 36 are defined by the walls 14A and 24A of the casing main body 14 and the cover 24. As schematically shown in the enlarged drawing of FIG. 24, the walls 14A and 24A are outwardly offset with respect to the inner working surfaces of the outer electrodes 16 and 20. Due to the presence of the offset walls 14A and 24A, the flow of water flowing past the apertures 16B and 20B tends to flow close to the walls 14A and 24A under the Coanda effect. This is advantageous in minimizing the turbulence 68 that would occur at the critical region of separation. The offset walls may be formed on the outer electrodes 16 and 20 by cutting out the end portions thereof as shown in FIG. 25. Alternatively, the end portion of the central electrode 18 may be recessed at both sides thereof as shown in FIG. 26 to form the wall portions 18B which are inwardly offset from the inner surfaces of the flow paths 34 and 36. The offset walls 18B also induce the Coanda effect to direct the main stream of laminar flow away from the apertures 16B and 20B so that any undesirable effect of turbulence is reduced.

FIG. 27 illustrates the simplest form of the electrolyzer embodying the present invention. Parts and members similar to those of the foregoing embodiments are indicated by like reference numerals and will not be described.

Referring to FIG. 27, the electrolyzer 80 similarly includes a main casing 82 and a cover 84 which together tightly hold a pair of electrodes 16 and 18 with the spacers 22 sandwiched therebetween. In this embodiment, a single flow path is formed by the electrodes 16 and 18 as will be apparent from the foregoing description.

The water inlet 26 is directly communicated with the flow path. However, it is possible to provide a water plenum chamber as used in the foregoing embodiments to ensure that a laminar flow is established with minimum inlet length.

The first electrode 16 is similarly provided with a slit-shaped aperture 16B for separating the thin layer of water flowing along the surface of the electrode 16 from the remainder of flow at the downstream region of the flow path. The aperture 16B is in communication with an elongated outlet 86 formed across the cover 84. A trough structure 88 is arranged beneath the outlet 86 so that water overflowing the outlet 86 is recovered in a suitable manner.

The most part of the laminar flow flowing through the flow path is advanced upwardly and is delivered to an elongated outlet 90 opening onto the rearwardly slanted upper face 92 of the casing 82. The slanted upper face 92 extends rearwardly to form a trough structure similar to the structure 88.

The mode of operation of this embodiment is similar to that of the foregoing embodiments. Thus, when an electric voltage is applied in such direction that the first electrode 16 operates as the anode with the second electrode serving as the cathode, highly acidic water will be obtained at the outlet 86. Conversely, when the voltage is applied in the reverse direction, strongly alkaline water will be recovered from the outlet 86.

While the present invention has been described herein with reference to the specific embodiments thereof, it is contemplated that the invention is not limited thereby and various modifications and alterations may be made therein without departing from the scope of the invention.

What is claimed is:

1. A continuous flow-type apparatus for electrolyzing water to produce acidic and/or alkaline water, said apparatus comprising:

a casing having an inlet for water, a first outlet, a second outlet, and a flow path of a slit-shaped cross-section extending from an upstream end to a downstream end thereof, said upstream end of said flow path being in fluid communication with said inlet and said downstream end being in fluid communication with said first outlet, said flow path having first and second parallel planar opposite surfaces which are spaced apart from one another at such a small distance that laminar flow is established in said flow path as water flows from said upstream end to said downstream end;

means including a pair of planar opposite electrodes arranged in said casing for electrolyzing water as it flows in the form of laminar flow through said flow path thereby to generate along said first surface a first layer of acidic or alkaline water and along said second surface a second layer of alkaline or acidic water, depending on the polarity of an electric potential applied between said electrodes; and, means including a slit-shaped aperture extending perpendicular to the direction of said laminar flow in said path and opening onto said second surface for separating said second layer of water away from the remainder of said laminar flow in a direction perpendicular to the direction of said laminar flow and perpendicular to said second surface;

said aperture being situated upstream of and adjacent to said downstream end of said flow path and being spaced from said downstream end by such a distance that laminar flow as established in said flow path is substantially sustained in a region of said flow path situated downstream of said aperture as water flowing in said flow path is advanced past said aperture in the direction of said flowpath;

said aperture being in fluid communication with said second outlet whereby the thus separated second layer is delivered to said second outlet with the remainder of water flow being delivered to said first outlet.

2. An apparatus according to claim 1, wherein the transversal extent (W) of said flow path as measured perpendicular to the axis (78) of said path and parallel to said surfaces is greater than 0.09 times of the flow rate of said flow path where the transversal extent of said flow path is expressed in terms of cm with the flow rate being expressed in terms of cm$^3$/sec.

3. An apparatus according to claim 2, wherein said transversal extent (W) of said flow path is greater than 0.14 times of the flow rate of said flow path.

4. An apparatus according to claim 1, further comprising a water plenum chamber disposed between said inlet and said upstream end of said flow path and extending throughout the entire transversal extent of said upstream end to distribute incoming water over the entire transversal extent of said upstream end.

5. An apparatus according to claim 1, further comprising a first buffer storage chamber disposed between said downstream end of said flow path and said first outlet and extending throughout the entire transversal extent of said downstream end, said first buffer storage chamber having a sufficiently large volume as compared with the flow rate of said flow path so that water flowing out of said downstream end is smoothly recovered in said first buffer storage chamber.

6. An apparatus according to claim 5, wherein the depth (H) of said first buffer storage chamber as measured in the direction of flow of said flow path is greater than 6 times of the distance (d) between said first and second surfaces of said flow path.

7. An apparatus according to claim 5, wherein said first buffer storage chamber has a cross-sectional flow area larger than that of said flow path.

8. An apparatus according to claim 5, further comprising a second buffer storage chamber disposed between said slit-shaped aperture and said second outlet and extending throughout the entire length of said aperture, said second buffer storage chamber having a sufficiently large volume as compared with the flow rate across said aperture so that water flowing out of said aperture is smoothly recovered in said second buffer storage chamber.

9. An apparatus according to claim 8, wherein the depth of said second buffer storage chamber as measured perpendicular to said second surface is greater than 6 times of the width (R) of said aperture as measured in the direction of flow of said flow path.

10. An apparatus according to claim 8, wherein said second buffer storage chamber has a cross-sectional flow area larger than that of said aperture.

11. An apparatus according to claim 1, wherein the width (R) of said aperture as measured in the direction of flow of said flow path is less than 3 times of the distance (d) between said first and second surfaces.

12. An apparatus according to claim 1, wherein said electrodes are rectangular in form and wherein said flow path and said electrodes are arranged such that water flows perpendicular to the long side of the rectangle of said electrodes.

13. An apparatus according to claim 1, further comprising flow control valve means for proportioning the flow rates through said first and second outlets.

14. An apparatus according to claim 1, wherein the downstream region of one of said first and second surfaces situated downstream of said aperture is outwardly offset with respect to the upstream region of said one surface so as to deflect the main stream in said laminar flow toward said one surface.

15. An apparatus for electrolyzing water to produce acidic and/or alkaline water, said apparatus comprising:

a casing having an inlet for water and a flow path of a slit-shaped cross-section, said flow path having an upstream end in fluid communication with said inlet and a downstream end, said flow path having first and second parallel planar opposite surfaces which are spaced apart from one another at such a small distance that laminar flow is established in said flow path as water flows from said upstream end to said downstream end;

means including a pair of planar opposite electrodes arranged in said casing for electrolyzing water as it flows through said flow path thereby to generate along said first surface a first layer of acidic or alkaline water and along said second surface a second layer of alkaline or acidic water, depending on the polarity of an electric potential applied between said electrodes; and, means including a slit-shaped aperture extending perpendicular to the direction of said laminar flow in said path and opening onto said second surface for separating said second layer of water away from the remainder of said laminar flow in a direction perpendicular to the direction of said laminar flow and perpendicular to said second surface;

said aperture being situated upstream of and adjacent to said downstream end of said flow path and being spaced from said downstream end by such a distance that laminar flow as established in said flow path is substantially sustained in a region of said flow path situated downstream of said aperture as water flowing in said flow path is advanced past said aperture in the direction of said flowpath.

16. A process for producing acidic water by the electrolysis of water, said process comprising the steps of:

providing a flow path having a slit-shaped cross-section and having an upstream end and a downstream end, said flow path being defined by first and second opposite surfaces, said surfaces being spaced apart from one another at a distance small enough to establish a laminar flow when water is allowed to flow therethrough;

positioning planar cathodic and anodic electrodes with the working surfaces thereof in flush with said first and second surfaces, respectively;

providing a slit-shaped recovery port opening onto the downstream region of said second surface and extending perpendicular to the direction of flow in said flow path, said recovery port being located upstream of said downstream end of said flow path at such a distance from said downstream end that laminar flow as established in said flow path is substantially sustained as water flowing in said flow path is advanced past said port in the direction of said flow path;

causing water to flow throughout said flow path while allowing laminar flow to be established in said flow path;

applying an electric potential between said electrodes to electrolyze water thereby to produce a layer of acidic water flowing along said second surface; and, causing said layer of acidic water to flow out of said port in a direction perpendicular to the direction of said laminar flow and perpendicular to said second surface while substantially maintaining said laminar flow in the region of said flow path downstream of said port whereby said layer of acidic water is separated from the remainder of said laminar flow and is recovered from said port.

17. A process for producing alkaline water by the electrolysis of water, said process comprising the steps of:

providing a flow path having a slit-shaped cross-section and having an upstream end and a downstream end, said flow path being defined by first and second opposite surfaces, said surfaces being spaced apart from one another at a distance small enough to establish a laminar flow when water is allowed to flow therethrough;

positioning planar anodic and cathodic electrodes with the working surfaces thereof in flush with said first and second surfaces, respectively;

providing a slit-shaped recovery port opening onto the downstream region of said second surface and extending perpendicular to the direction of flow in said flow path, said recovery port being located upstream of said downstream end of said flow path at such a distance from said downstream end that laminar flow as established in said flow path is substantially sustained as water flowing in said flow path is advanced past said port in the direction of said flow path;

causing water to flow throughout said flow path while allowing laminar flow to be established in said flow path;

applying an electric potential between said electrodes to electrolyze water thereby to produce a layer of alkaline water flowing along said second surface; and, causing said layer of alkaline water to flow out of said port in a direction perpendicular to the direction of said laminar flow and perpendicular to said second surface while substantially maintaining said laminar flow in the region of said flow path downstream of said port whereby said layer of alkaline water is separated from the remainder of said laminar flow and is recovered from said port.

18. A process for producing chlorinated acidic water by the electrolysis of an aqueous solution of sodium chloride, said process comprising the steps of:

providing a flow path having a slit-shaped cross-section and having an upstream end and a downstream end, said flow path being defined by first and second opposite surfaces, said surfaces being spaced apart from one another at a distance small enough to establish a laminar flow when fluid is allowed to flow therethrough;

positioning planar cathodic and anodic electrodes with the working surfaces thereof in flush with said first and second surfaces, respectively;

providing a slit-shaped recovery port opening onto the downstream region of said second surface and extending perpendicular to the direction of flow in said flow path, said recovery port being located upstream of said downstream end of said flow path at such a distance from said downstream end that laminar flow as established in said flow path is substantially sustained as fluid flowing in said flow path is advanced past said port in the direction of said flow path;

causing an aqueous solution of sodium chloride to flow throughout said flow path while allowing laminar flow to be established in said flow path;

applying an electric potential between said electrodes to electrolyze aqueous solution of sodium chloride thereby to produce a layer of chlorinated acidic water flowing along said second surface; and, causing said layer of chlorinated acidic water to flow out of said port in a direction perpendicular to the direction of said laminar flow and perpendicular to said second surface while substantially maintaining said laminar flow in the region of said flow path downstream of said port whereby said layer of chlorinated acidic water is separated from the remainder of said laminar flow and is recovered from said port.

19. A process for producing strongly alkaline water by the electrolysis of an aqueous solution of sodium chloride, said process comprising the steps of:

providing a flow path having a slit-shaped cross-section and having an upstream end and a downstream end, said flow path being defined by first and second opposite surfaces, said surfaces being spaced apart from one another at a distance small enough to establish a laminar flow when fluid is allowed to flow therethrough;

positioning planar anodic and cathodic electrodes with the working surfaces thereof in flush with said first and second surfaces, respectively;

providing a slit-shaped recovery port opening onto the downstream region of said second surface and extending perpendicular to the direction of flow in said flow path, said recovery port being located upstream of said downstream end of said flow path at such a distance from said downstream end that laminar flow as established in said flow path is substantially sustained as fluid flowing in said flow path is advanced past said port in the direction of said flow path;

causing an aqueous solution of sodium chloride to flow throughout said flow path while allowing laminar flow to be established in said flow path;

applying an electric potential between said electrodes to electrolyze aqueous solution of sodium chloride thereby to produce a layer of strongly alkaline water flowing along said second surface; and, causing said layer of strongly alkaline water to flow out of said port in a direction perpendicular to the direction of said laminar flow and perpendicular to said second surface while substantially maintaining said laminar flow in the region of said flow path downstream of said port whereby said layer of strongly alkaline water is separated from the remainder of said laminar flow and is recovered from said port.

\* \* \* \* \*

UNITED STATES PATENT AND TRADEMARK OFFICE
CERTIFICATE OF CORRECTION

PATENT NO. : 5,534,120
DATED : July, 9, 1996
INVENTOR(S) : ANDO, ET AL.

It is certified that error appears in the above-indentified patent and that said Letters Patent is hereby corrected as shown below:

Claim 1, col. 14, line 30, "flowpath" should read
--flow path--.

Claim 15, col. 15, lines 62-63, "distance:that" should read
--distance that--.

Signed and Sealed this

Twenty-ninth Day of October 1996

Attest:

BRUCE LEHMAN

*Attesting Officer*  *Commissioner of Patents and Trademarks*